United States Patent [19]

Wang et al.

[11] Patent Number: 5,615,334
[45] Date of Patent: Mar. 25, 1997

[54] MEMORY REFLECTION SYSTEM AND METHOD FOR REDUCING BUS UTILIZATION AND DEVICE IDLE TIME IN THE EVENT OF FAULTS

[75] Inventors: Shih-Chieh Wang; Wei-Wen Chang; Lu-Ping Chen, all of Taipei, Taiwan

[73] Assignee: Industrial Technology Research Institute, Hsinchu, Taiwan

[21] Appl. No.: 321,205

[22] Filed: Oct. 7, 1994

[51] Int. Cl.[6] ............................. G06F 11/00; G06F 12/00
[52] U.S. Cl. .................... 395/185.01; 395/473; 395/472
[58] Field of Search ................................ 395/185.01, 473, 395/182.03, 472, 471, 474; 364/230, 230.4, 964, 964.2

[56] References Cited

U.S. PATENT DOCUMENTS

| | | | |
|---|---|---|---|
| 5,072,369 | 12/1991 | Theus et al. | 395/425 |
| 5,119,485 | 6/1992 | Ledbetter, Jr. et al. | 395/425 |
| 5,255,369 | 10/1993 | Dann | 395/200 |
| 5,325,503 | 6/1994 | Stevens et al. | 395/427 |
| 5,335,335 | 8/1994 | Jackson et al. | 395/425 |
| 5,341,487 | 8/1994 | Derwin et al. | 395/425 |
| 5,347,648 | 9/1994 | Stamm et al. | 395/575 |
| 5,404,489 | 4/1995 | Woods et al. | 395/425 |
| 5,446,863 | 8/1995 | Stevens et al. | 395/427 |
| 5,450,546 | 9/1995 | Hassler et al. | 395/495 |
| 5,455,925 | 10/1995 | Kitahara et al. | 395/449 |
| 5,463,753 | 10/1995 | Fry et al. | 395/473 |
| 5,469,555 | 11/1995 | Ghosh et al. | 395/460 |

OTHER PUBLICATIONS

Martinez, The 88000: An Engine for Multiprocessing, Computer Design, Nov. 13, 1989, at S24.
Andrews, Futurebus+ Closes Reality Gap, Computer Design, Dec. 1, 1990, at 40.
Andrews, Multiprocessing to Bring the Next Jump in Performance, Computer Design, Feb. 1992, at 78.
Wald, P.D., "Reflective memory upgrade for NTFC and data acquisition sys," May 1996, pp. 137–146, Proceedings International Inst. Syp. 1996.
Anderson et al., "Two techniques for improving performance on bus–based multiprocessors," 1995, pp. 537–551, Future Generation Computer Systems v 11 n 6 Oct. 1995.

*Primary Examiner*—Robert W. Beausoliel, Jr.
*Assistant Examiner*—Norman M. Wright
*Attorney, Agent, or Firm*—Meltzer, Lippe, Goldstein, et al.

[57] ABSTRACT

A memory reflection scheme is disclosed including a snarfing agent provided with efficient memory reflection circuitry for snarfing data. The memory reflection circuitry is for snarfing particular data written back from a write back agent to a memory subsystem agent. In response to unsuccessfully snarfing the particular data written back from the write back agent to the memory subsystem agent, the memory reflection circuitry issues a command to read the particular data from the memory subsystem agent. However, the memory reflection circuitry only issues such a command if the write back agent successfully writes back the particular data to the memory subsystem agent.

26 Claims, 12 Drawing Sheets

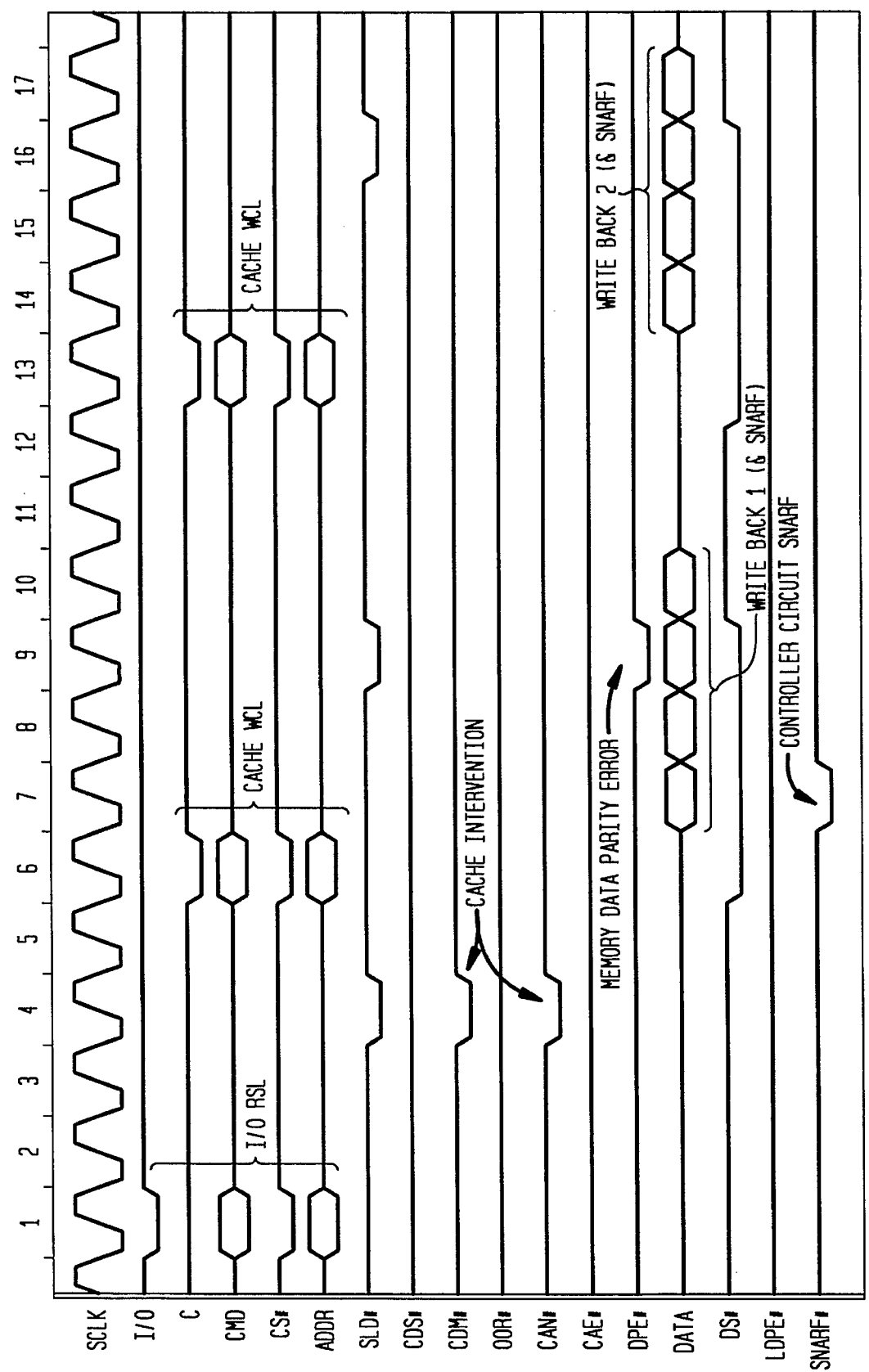

MEMORY REFLECTION SYSTEM AND METHOD FOR REDUCING BUS UTILIZATION AND DEVICE IDLE TIME IN THE EVENT OF FAULTS

RELATED APPLICATIONS

The following patent applications are assigned to the assignee hereof and contain subject matter related to the subject matter of the present patent application:

1. U.S. patent application Ser. No. 08/071,721, entitled "Memory Consistent Pre-ownership Method and System for Transferring Data Between an I/O Device and a Main Memory," filed Jun. 4, 1993 for Chang-Lun Chen, Allen S. C. Wang, and Wei-Wen Chang, and 2. U.S. patent application Ser. No. 08/320,520, entitled "Transfer Labelling Mechanism for Multiple Outstanding Read Requests on a Split Transaction Bus," filed on even date herewith for Shih-Chieh WANG, Kang-Wei CHANG and Jiahn-Jung CHEN. The contents of the above-listed patent applications are incorporated herein by reference.

FIELD OF THE INVENTION

The present application is related to transferring data on a data bus between multiple devices connected to the bus, such as cache memories, processors, I/O bridges, and a shared memory. In particular, the present invention relates to an efficient manner of transferring data between the devices which maintains the consistency of the data in the shared memory. Even in the event of an error or busy condition, the present invention maintains the integrity of the data in an efficient manner.

BACKGROUND OF THE INVENTION

FIG. 1 shows a computer system 10. The computer system 10 has one or more processors 11-1, 11-2, . . . , 11-n connected via an associated cache memory 13-1, 13-2, . . . , 13-n to a system bus 16. A shared memory 14 and an I/O bridge 18 are also connected to the system bus 16. The function of each of these devices in the computer system 10 is described below.

The shared memory 14 includes an array of storage locations for storing fixed length data, e.g., eight bit long or byte long data. Each storage location has a unique identifier which is used in data access, i.e., read and write, commands for specifying the particular storage location from which data should be read or into which data should be written. Illustratively, the storage locations are further organized into data line storage locations for storing fixed length (e.g., thirty-two byte long), non-overlapping, contiguous blocks of data called data lines. Each data line storage location has a unique line address similar to the aforementioned addresses for specifying a particular data line storage location to read a data line from or to write a data line into.

The system bus 16 is for transferring data addresses and commands between the devices, i.e., the processors 11-1 to 11-n, cache memories 13-1 to 13-n, shared memory 14 and I/O bridge 18, connected thereto. As shown, the system bus 16 includes a data bus 16-1 for transferring data, a command bus 16-2 for transferring commands and addresses, and an arbitration bus 16-3. The arbitration bus 16-3 is used for allocating the system bus 16 to the devices connected thereto. Illustratively only a limited number of devices can transmit on the system bus 16 at one time. For instance, only one device may transmit a command and address on the command bus 16-2 and only one device may transmit data on the data bus 16-1 at one time (although it may be possible for both devices to use their respective busses simultaneously). Illustratively, the computer system 10 has an elaborate arbitration protocol for allocating the system bus 16 to the devices of the computer system 10 in a fair and orderly manner.

The processors 11-1 to 11-n are for executing program instructions. In the course of executing these instructions, the processors may issue data access, i.e., data read and data write, commands. Furthermore, the program instructions themselves are stored as data in the shared memory 14.

The cache memories 13-1 to 13-n are small high speed memories for maintaining a duplicate copy of data of the shared memory. Despite their relatively small size in comparison to the shared memory 14, the cache memories dramatically reduce the number of data accesses to the shared memory 14. This is because cache memories 13-1 to 13-n exploit temporal and spatial locality of reference properties of processor data accesses. Temporal locality of reference is the tendency of processors 11-1 to 11-n to access the same data over and over. This property arises from program flow control instructions such as loops, branches and subroutines which cause the processors 11-1 to 11-n to repeat execution of certain recently executed instructions. Spatial locality of reference refers to the tendency of processors to access data having addresses near the addresses of other recently accessed data. This property arises from the sequential nature of program instruction execution, i.e., the processor tends to execute instructions in the sequential order in which they are stored as data. In order to exploit this property, cache memories typically store an entire data line corresponding to a recently accessed data. (Herein, a data line is said to correspond to particular data if the data line, or its counterpart in the shared memory, includes at least part of the particular data in question.) Thus, the likelihood increases that the cache memories 13-1 to 13-n can satisfy future accesses to data not yet accessed (assuming that future accesses will be to other data corresponding to the data lines already stored in the cache memories 13-1 to 13-n).

The cache memories 13-1 to 13-n work as follows. When the corresponding processor, e.g., the processor 11-1, issues a data access command, the associated cache memory 13-1 determines if it contains the accessed data. If so, a read or write (depending on whether the processor issued a read or write command) hit is said to occur and the cache memory 13-1 satisfies the processor data access using the copy of the data therein. If the cache memory 13-1 does not contain the accessed data, a read or write miss is said to occur. In the event of a read or write miss, the cache memory 13-1 issues a command for reading the data line corresponding to the accessed data from the shared memory 14. The cache memory 13-1 receives and stores a copy of the data line. The cache memory 13-1 may then utilize the copy of the data line stored therein to satisfy the data access command.

Cache memories 13-1 to 13-n must maintain the consistency of the data in the shared memory 14. That is, while a cache memory 13-1 to 13-n may modify its copy of the data, the counterpart copy of the cache memory's data in the shared memory 14 must invariably be accordingly modified. According to one memory consistent manner of operating a cache memory (e.g., the cache memory 13-1) called write through, the cache memory 13-1 immediately attempts to update the counterpart copy in the shared memory 14 whenever the processor 11-1 modifies the cache memory's 13-1 copy of the data. This manner of operating the cache memory 13-1 is disadvantageous because the cache memory 13-1 must continually use the system bus 16 to access the shared memory 14 each time the associated processor 11-1 modifies the data.

In order to reduce the demands on the slow shared memory 14 and system bus 16, the cache memories 13-1 to 13-n operate in a manner called "write back." According to this manner of operation, each cache memory 13-1 to 13-n defers updating or writing back the modified data line until a later time. For instance, if the cache memory, e.g., the cache memory 13-1, runs out of storage space, the cache memory 13-1 may write back a modified data line to provide an available storage space for an incoming data line. Alternatively, as described in greater detail below, the cache memory 13-1 may write back a data line when another device attempts to read that data line.

The I/O bridge 18 interconnects the system bus 16 and I/O expansion bus 20. One or more I/O devices 22, such as Ethernet interfaces, FDDI interfaces, disk drives, etc., are connected to the I/O expansion bus 22.

The purpose of the I/O bridge 18 is to "decouple" the system bus 16 and the I/O expansion bus 20. Typically, data is transmitted in different formats and at different speeds on these two busses 16 and 20. For instance, data may be transmitted in sixteen byte packets on the system bus 16 at 33 MHz while data is transmitted in four byte groups at 8 MHz on the I/O expansion bus 20. The I/O bridge 18 may receive data packets from a device, e.g., the processor 11-1, connected to the system bus 16, and temporarily store the data of these packets therein. The I/O bridge 18 then transmits the received, "depacketized" data in four byte groups to an I/O device 22 on the I/O expansion bus 20. Likewise, the I/O bridge 18 may receive and temporarily store data from an I/O device 22 via the I/O expansion bus 20. The I/O bridge 18 then transmits the received data in packets to a device, e.g., the shared memory 14, connected to the system bus 16.

The processors 11-1 to 11-n, the cache memories 13-1 to 13-n and the I/O bridge 18 must operate in a manner which maintains the consistency of the data in the shared memory 14. For instance, suppose a first cache memory 13-1 modifies a copy of a data line of the shared memory 14 but does not write the data line back. If a second cache memory 13-2 issues a command to read the same data line, the second cache memory 13-2 should receive the copy of the modified data line in the first cache memory 13-1, not the stale copy stored in the shared memory 14.

To this end, the devices of the computer system 10 implement an ownership protocol. Before a device may access particular data, the device must successfully "claim ownership" in the corresponding data line. A device which does not successfully claim ownership in a data line cannot access the data corresponding thereto.

Illustratively, the ownership protocol is implemented as follows. Suppose the I/O bridge 18 desires to access a particular data line. For instance, when the I/O device 22 desires to write data to the shared memory 14, the I/O bridge 18 must claim ownership in the data lines stored in the destination addresses of the data to be written by the I/O device 22. (In fact, before an I/O bridge 18 can receive each data to be written from the I/O device 22 to the shared memory 14, the I/O bridge 18 must own the corresponding data line.) The I/O bridge 18 first issues a command for claiming ownership in the particular data line on the system bus 16. This ownership claiming command may simply be a command to read or write the particular data line. Each device monitors or "snoops" the system bus 16 for ownership claiming commands. After issuing the ownership claiming command, the I/O bridge 18 also monitors the bus for a specified period. If the another device currently owns the data line for which the I/O bridge 18 issued the ownership claim, this device may issue a response as described below. If, during the specified period, the I/O bridge 18 does not detect a response from another device indicating that the other device already owns the data line, the I/O bridge 18 successfully claims ownership in the data line.

Suppose at the time the I/O bridge 18 issues the ownership claiming command, a cache memory 13-2 already owns, but has not modified the data line. Illustratively, the cache memory 13-2 detects the command issued by the I/O bridge 18. In response, the cache memory 13-2 illustratively concedes ownership of the data line to the I/O bridge 18. To that end, the cache memory 13-2 simply marks its copy of the cache line invalid. At a later time, if the cache memory 13-2 desires to access data corresponding to this data line, the cache memory 13-2 must first claim ownership in the data line.

Alternatively, the cache memory 13-2 may mark the data line shared if the I/O device 18 indicates (from the ownership claim issued by the I/O bridge 18) that it does not desire to modify the data. Furthermore, the cache memory 13-2 issues a command to the I/O bridge 18 indicating that the data line is shared. Two or more devices can share ownership in a data line provided that none of the sharing devices has any intention of modifying the data line (that is, each sharing device wishes to read the data but not write the data). If one of the sharing devices later wishes to modify the data, that device issues an ownership claiming command which causes the other sharing devices to concede exclusive ownership to the device issuing the ownership claim.

Suppose at the time the I/O bridge 18 issues the ownership claim, the cache memory 13-2 already owns, has modified, but has not yet written back the data line in which the I/O bridge 18 attempts to claim ownership. In this case, the cache memory 13-2 first issues an intervention command on the system bus 16. The cache memory 13-2 then writes back its modified copy of the data line to the shared memory 14.

In response to detecting the intervention command, the I/O bridge 18 can do a number of things. These alternatives are illustrated in FIGS. 2 and 3. In FIGS. 2 and 3:

C indicates the issuance of commands by the cache memory 13-2,

I/O indicates the issuance of commands by the I/O bridge 18,

CS# (Command Strobe) indicates when a valid command is transmitted on the command bus 16-2, CMD is the command signal transmitted on the command bus 16-2, DS# (Data Strobe) indicates when valid data is transmitted on the data bus 16-1, ADDR is the address transmitted with the command signal, DATA is the data returned by the device (e.g., the shared memory 14) in response to the command, SLD# (Selected) is a signal transmitted by the selected recipient device of the command signal upon receiving the command therein, CDS# (Cache Data Shared) is a signal instructing an ownership claim command issuer to mark the data line shared. This signal may be transmitted by a device which snoops an ownership claim to an unmodified data line stored therein, CDM# (Cache Data Modified) is a signal instructing an ownership claim command issuer that another device already owns and has modified the data. This signal is transmitted by a device which snoops an ownership claim to a modified data line stored therein, CAN# (Command Acknowledge Negative) is a signal indicating that the recipient of the command is busy serving a previous command and that the command issuer should retry its command later, ORD# is a signal indicating that a memory subsystem intends to transfer data to some processor, CAE# (Command Address Error) is a signal indicating that either the command or address issued by the command issuer had a protocol, encoding or parity error, DPE# (Data Parity Error) indicates that data received from the command issuer had a parity error, and OOR# (Out of Order Response) is a signal instructing a read command issuer that the data requested by the issued read command will be transmitted out of order, i.e., in an arbitrary order in relation to the read command, on the data bus 16-1.

FIG. 2 is a timing diagram showing various signals generated during a first alternative memory transfer scheme. In FIG. 2, during cycle one of the system clock SCLK, the I/O bridge 18 issues a command for claiming ownership in a data line. This command is detected by the cache memory 13-2 which issues, on cycle four, the signals CDM# and CAN# indicating that it already owns, has modified, but has not yet written back the data in which the I/O bridge 18 attempted to claim ownership. (The shared memory 14 also responds with the SLD# signal to indicate it received the command. However, this event is insignificant as the CDM# and CAN# signals cause the shared memory 14 to abort transmitting data to the I/O bridge 18). The cache memory 13-2 then issues a write command on cycle six and writes back the modified cache line on cycles nine to twelve.

Meanwhile, in response to the CAN# signal, the I/O bridge 18 illustratively reissues its ownership claim on cycle six. The cache memory 13-2 detects this command and issues the CAN# signal on cycle nine to "negatively acknowledge" the command of the I/O bridge 18 (indicating that the command was not acknowledged). Subsequently, the cache memory 13-2 issues a write command on cycle 8 and writes back the data to the shared memory 14 via the data bus 16-1 on cycles nine to twelve. Finally, on cycle eleven, the I/O bridge 18 successfully issues its ownership claiming command. Assuming the I/O bridge 18 issues a read command, the data is returned to the I/O bridge 18 via the data bus 16-1 on cycles seventeen to twenty (not shown).

In the process illustrated in FIG. 2, the I/O bridge 18 must wait until after the cache memory 13-2 writes back the data to the shared memory 14. Then, the I/O bridge 18 can successfully re-issue its ownership claiming command to claim ownership in the data, e.g., read the data from the shared memory 14. This process is disadvantageous because many cycles are utilized to transfer ownership of the data line to the I/O bridge 18. Furthermore, the system bus 16 is utilized twice; once to transfer the modified data from the cache memory 13-2 to the shared memory 14 and once to transfer the data from the shared memory 14 to the I/O bridge 18.

FIG. 3 illustrates an alternative transfer scheme called "memory reflection." As before, the I/O bridge 18 issues its ownership claim command on cycle one. Likewise, the cache memory 13-2 responds on cycle four to indicate that it already owns a modified copy of the data line in which the I/O bridge 18 has attempted to claim ownership. Furthermore, the cache memory 13-2 issues a write command on cycle six and writes back the modified cache line to the shared memory 14 on cycles seven to ten. This is possible because the I/O bridge 18 does not re-issue its command for claiming ownership in the cache line on cycle six. Rather, the I/O bridge 18 enters a tracking mode in which the I/O bridge 18 monitors the command bus 16-2 for the write command issued by the cache memory 13-2. Thus, on cycle six, the I/O bridge 18 can detect the cache memory's 13-2 command and address for writing back the data line in which the I/O bridge 18 unsuccessfully claimed ownership. When the cache memory 13-2 transfers the data to the shared memory 14 on cycles seven to ten, the I/O device 18 "snarfs" or receives the data on cycles seven to ten from the data bus 16-1 at the same time as the shared memory 14.

Stated more generally, the memory reflection scheme is utilized by a "write back agent", a "memory subsystem agent" and one or more "snarf agents." A "write back agent" is a device, such as the cache memory 13-2, which writes back a modified data line. A "memory subsystem agent" is a device, such as the shared memory 14, in which the integrity of data must be maintained. A "snarfing agent" is a device, such as the I/O bridge 18, which attempts to claim ownership in the data line. When the write back agent writes back the data line to the memory subsystem agent, the snarfing agents snarfs the data. The memory reflection scheme requires approximately one half the time of the above process. Moreover, the memory reflection scheme utilizes only one data transfer on the system bus 16 to transfer data to two destinations contemporaneously.

The memory reflection scheme described above presumes that neither the snarf agent 18 nor the memory subsystem agent 14 detects an error in the data written back from the write back agent 13-2. The system bus 16 operates according to the XA-MP protocol. XA-MP does not provide any manner for agents to specify a "broadcast" type of command or data transmission in which multiple receiving agents can be specified. This is problematic if a snarfing or memory subsystem agent generates an error/busy signal DPE#, CAE# or CAN# on the system bus 16 in the memory reflection scheme described above. In response to detecting a CAN# signal indicating that a device which received a data access command is busy, the device which issued the command repeatedly re-issues the command until the recipient device accepts the command. Such a CAN# signal can also be issued by one or more snarfing agents 13-2 or the memory subsystem agent 14 in response to a command issued by a write back agent for writing back a modified data line. Similarly, if a recipient, i.e., snarfing or memory subsystem agent, of a command and address or data detects an error in the received data, the recipient may issue an appropriate error signal CAE# or DPE#, respectively. Such errors may be caused by noise, electromagnetic turbulence and clock skew and tend to occur more frequently when more than one agent receives commands and data from the system bus 16.

Consider the case where only some, but not all, of the recipient agents, i.e., the snarfing agents or the memory subsystem agents, issue an error/busy signal in response to the write back agent writing back its modified data line. In order to guarantee the integrity of data in the computer system 10, the write back agent 13-2 must reissue the modified data line and/or write back command. As a consequence, the write back agent does not relinquish ownership in the data line. Thus, even the agents which successfully receive the data line must suspend further processing of the received data line until the write back agent successfully writes back the data line. For example, Table 1 summarizes the action taken by each of the three classes of agents. Each column shows one of three scenarios: an error/busy signal can only be issued by the memory subsystem agent 14, an error/busy signal can only be issued from a snarfing agent, and an error/busy signal may be issued by both the memory subsystem agent and a snarfing agent simultaneously:

TABLE 1

| Error →<br>location<br>Agent<br>↓ | error/busy<br>incurred at<br>memory<br>subsystem<br>agent only | error/busy<br>incurred at<br>snarfing<br>agent(s) only | error/busy<br>incurred at<br>memory sub-<br>system agent &<br>snarfing agent |
|---|---|---|---|
| snarfing agent | suspend processing or re-snarf data | re-snarf data | re-snarf data |
| memory subsystem agent | re-receive data | re-receive data | re-receive data |
| write back agent | re-write back data and command | re-write back data and command | re-write back data and command |

As can be seen in Table 1, the write back agent 13-2 must re-issue the data and command in each scenario regardless of how many or which agents received correct data. Furthermore, both the memory subsystem and snarfing agents must suspend processing and wait for the write back agent to successfully re-issue its data and command to all snarfing and memory subsystem agents regardless of how many or which agents issued an error/busy signal.

It is therefore an object of the present invention to overcome the disadvantages of the prior art.

SUMMARY OF THE INVENTION

This and other objects are achieved by the present invention which provides an efficient fault-tolerant memory consistent reflection scheme for snarfing data. When a snarfing agent attempts to claim ownership in data modified by a write back agent, the write back agent writes the data back to the memory subsystem. During this memory write back procedure, the snarfing agent attempts to snarf the data, i.e., receive the data at the same time as the shared memory (e.g., from the system bus). It is possible that the writing back of data to the memory subsystem agent, or the snarfing of data by the snarfing agent, or both, may be unsuccessful. For example, the snarfing and/or memory subsystem agent may be busy and/or the write command, address and/or data received thereat may contain errors. However, according to the memory reflection scheme of the present invention, the writing back of data is completed provided that at least the memory subsystem agent successfully receives the data. If only the snarfing of data by a snarfing agent was unsuccessful, the snarfing agent must re-issue a command for claiming ownership in the data. Likewise, whether or not the snarfing agent successfully snarfed the data, the write back agent re-writes back the data to the memory subsystem agent until the data is successfully written therein. Furthermore, the snarfing agent suspends processing the snarfed data until the write back to the memory subsystem is successful.

According to one embodiment, a snarfing agent is provided with efficient memory reflection circuitry for snarfing, i.e., receiving, particular data as it is written back from a write back agent to a memory subsystem. There are three cases to consider. In a first case, the memory reflection circuitry in the snarfing agent does not successfully snarf the data, but the write back agent successfully writes back the data to the memory subsystem agent. Illustratively, the memory reflection circuitry in the snarfing agent can detect a successful write back by the absence of an error or busy signal transmitted in response to the writing back of data. In this case, the memory reflection circuitry issues a command to claim ownership in the particular data, which particular data is now contained in the memory subsystem agent. In a second case, the memory reflection circuitry successfully snarfed the data but the write back agent did not successfully write back the data to the memory subsystem agent. Illustratively, if the memory reflection circuitry detects an error or busy signal transmitted on the bus in response to the write back, the memory reflection circuitry determines that the write back was not successful. In such a case, the memory reflection circuitry in the snarfing agent illustratively suspends processing of the snarfed data in the snarfing agent until the write back agent successfully writes the particular data back to the memory subsystem agent. Finally, in a third case, the memory reflection circuitry does not successfully snarf the data and the write back agent does not successfully write the data back to the memory subsystem agent. In this case, the memory reflection circuitry in the snarfing agent attempts to re-snarf the data when the write back agent re-writes back the data to the memory subsystem agent.

The inventive memory reflection scheme provides the following advantages:

1. Data integrity is assured even in the event one or more receiving agents is busy or detects an error in the transmission of commands, addresses or data during the write back.
2. The write back agent needs only re-write back data until the memory subsystem agent successfully receives a copy of the data. This enables the write back agent and other snarfing agents to resume other processing sooner.
3. The memory reflection scheme works even if the computer system has conventional snarfing agents. While conventional snarfing agents can still slow down the memory reflection scheme (by causing the write back agent to re-write back the data), the snarfing agents adapted according to the present invention will not. Thus, on average, the inventive snarfing agents will still speed up the memory reflection scheme (considering that any agent can experience an error or busy condition).

In short, an efficient memory reflection scheme is provided in which at least one snarfing agent does not cause the write back agent to re-write back data if that snarfing agent does not successfully snarf the data. This provides an overall speed up in the memory reflection scheme on average, even in the event of an error or busy condition, yet maintains the integrity of the data.

BRIEF DESCRIPTION OF THE DRAWING

FIGS. 6(a)–6(b) are timing diagrams illustrating scenarios in which only the memory subsystem agent incurs an error or busy condition.

DETAILED DESCRIPTION OF THE INVENTION

Figure 1:
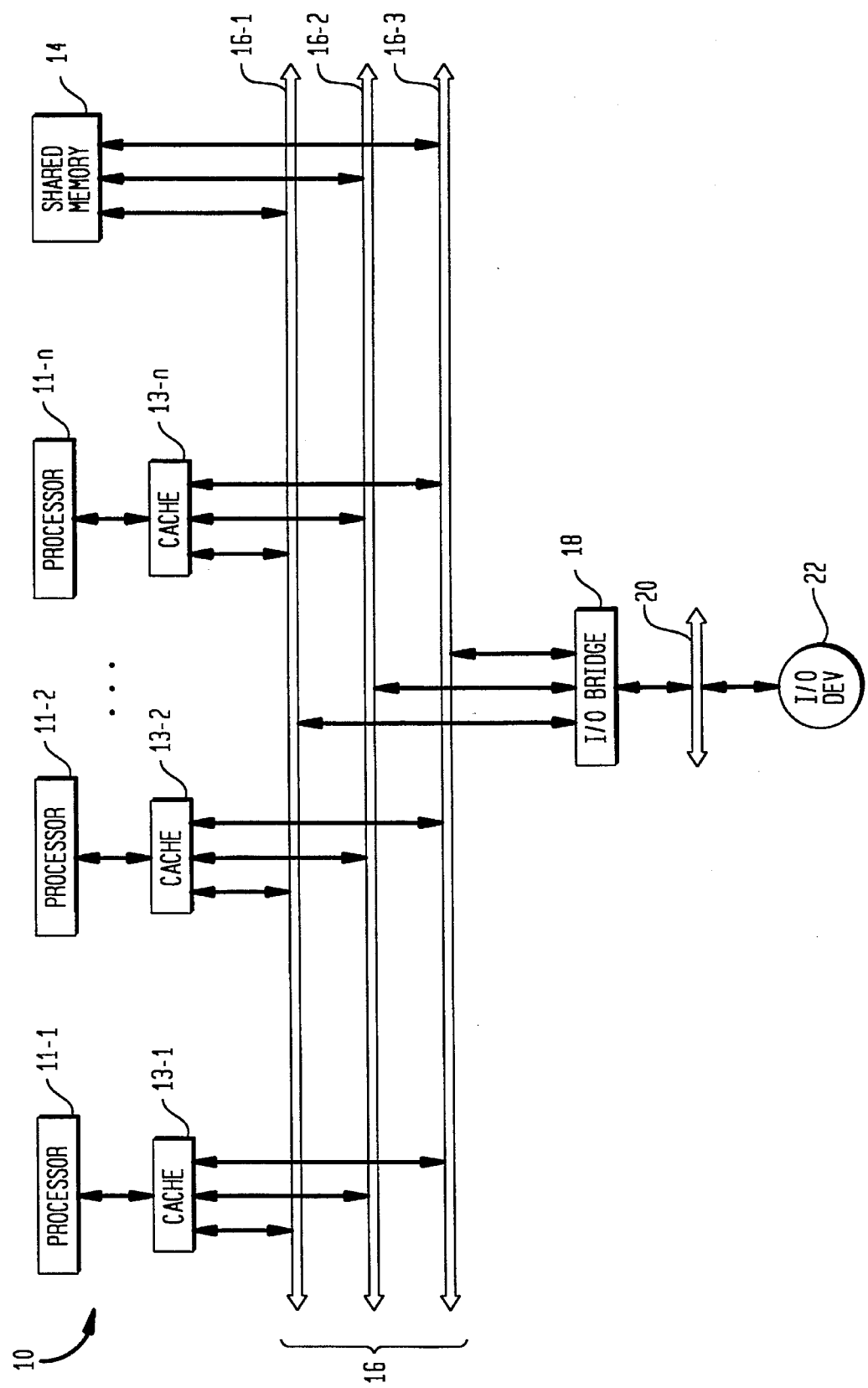
FIG. 1 shows a conventional computer system.
Figure 2:
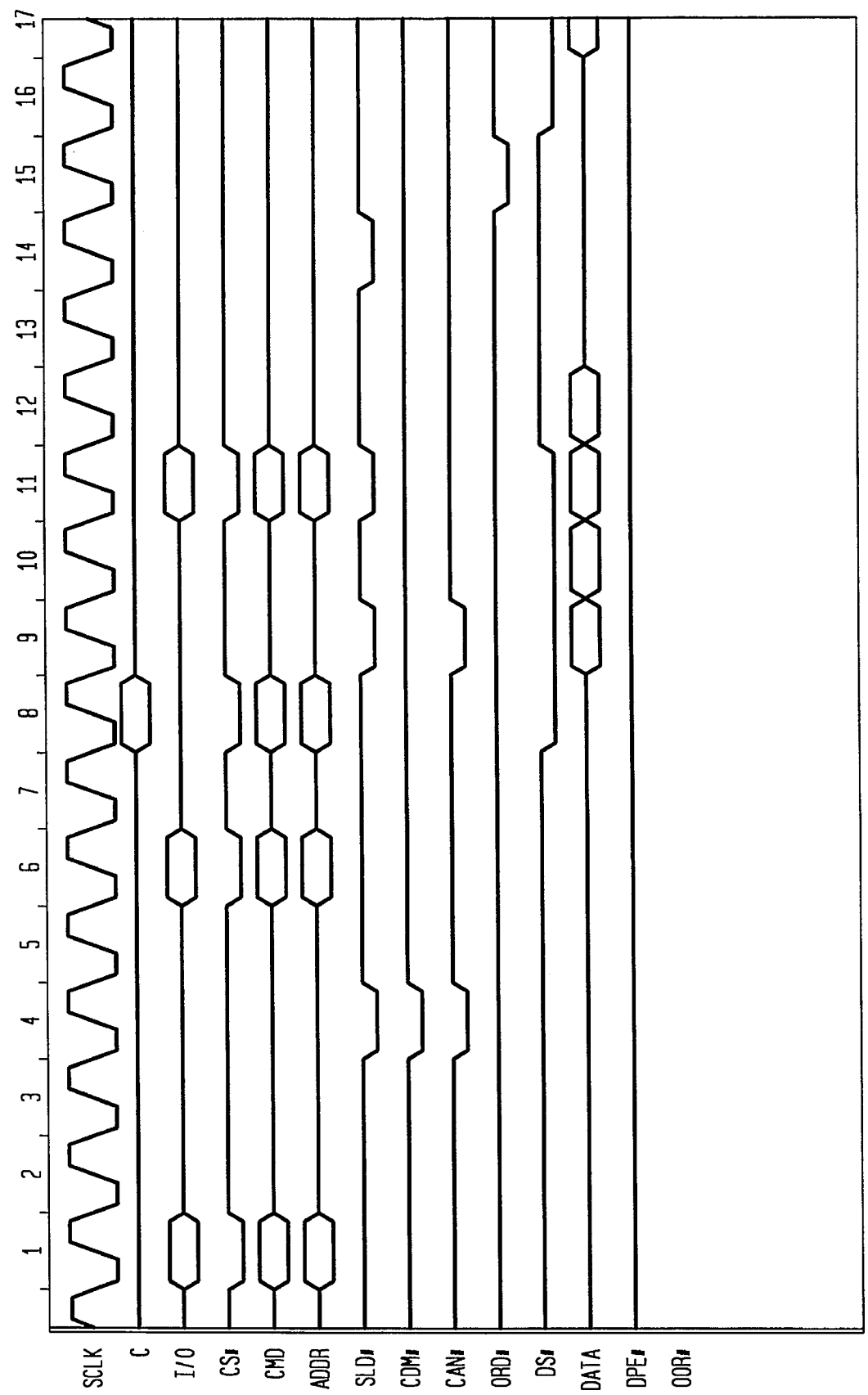
FIG. 2 is a timing diagram illustrating an ownership claim-write back scheme utilizing at least two transfers of data.
Figure 3:
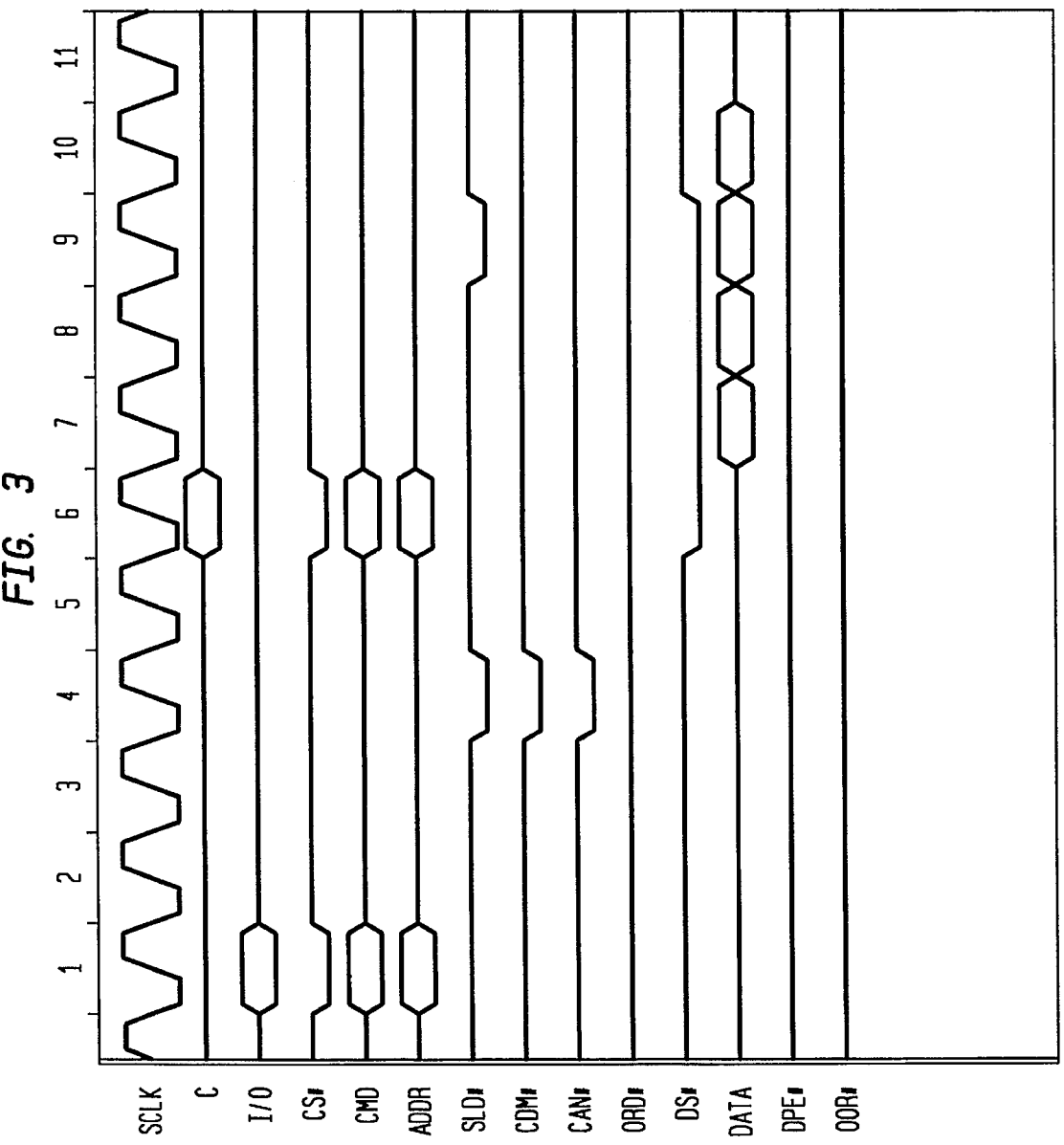
FIG. 3 is a timing diagram illustrating a conventional memory reflection scheme.
Figure 4:
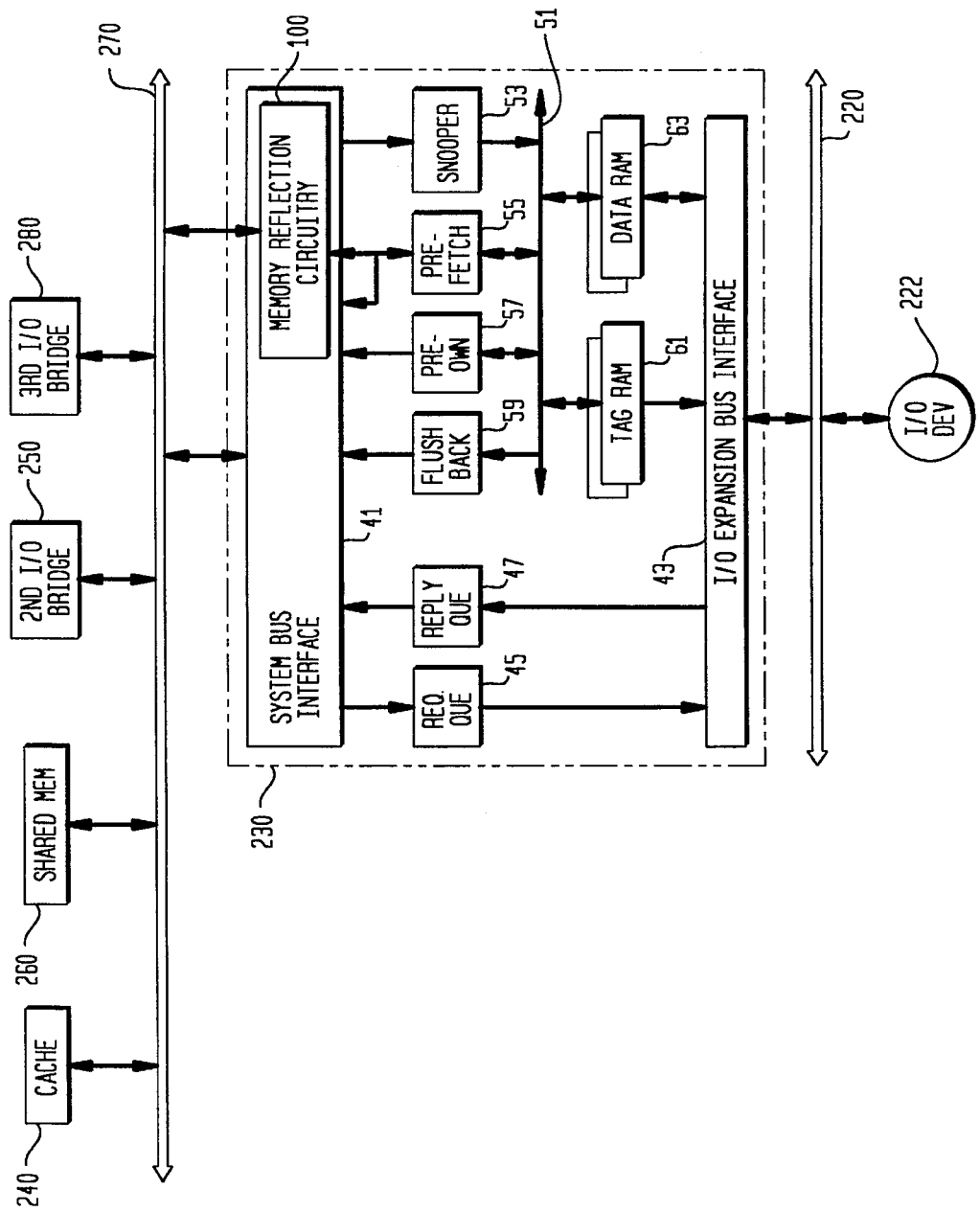
FIG. 4 shows a computer system including a snarfing agent, in the form of a I/O bridge, according to the present invention.

The present invention can be implemented in any snarfing agent, i.e., a processor, cache memory or I/O bridge of the present invention. FIG. 4 shows an illustrative computer system 200 according to one embodiment of the present invention. The computer system has a shared memory 260, a cache memory 240, a first I/O bridge 230, a second I/O bridge 250 and a third I/O bridge 280 connected to a system bus 270. Illustratively, the first and second I/O bridges 230 and 250 are adapted according to the present invention. However, this is merely illustrative; one, some or all of the cache memories, I/O bridges, and processors can be adapted as described below.

As shown, the I/O bridge 230 is connected to an I/0 device 222 via an I/O expansion bus 220. Illustratively, the I/O bridge 230 is a sophisticated I/O bridge capable of pre-issuing pre-ownership claims such as described in U.S. patent application Ser. No. 08/071,721. The I/O bridge 230 has a system bus interface 41 connected to the system bus 270 and an I/O expansion bus interface 43 connected to a corresponding I/O expansion bus 220. The interfaces 41 and 43, among other things, multiplex data, commands and other control signals into a form suitable for transmission on the corresponding bus 270 or 220 connected thereto, and demultiplex data, commands and other control signals from the corresponding bus 270 or 220. A request queue 45 and a reply queue 47 are connected in between the system bus interface 41 and the I/O expansion bus interface 43 for buffering commands transmitted between the I/O device 222 and another write back or snarf agent 240 or 250 (FIG 4).

The I/O bridge 230 illustratively also has an internal bus 51 for local communication of data and command signals between a snooper circuit 53, a pre-fetch circuit 55, a pre-own circuit 57, a flush back circuit 59, a tag RAM 61, and a data RAM 63. The operation of the I/O bridge 230 is now briefly explained. Suppose the I/O device 222 has a block of data words to write to particular sequential address in the shared memory 260. In such a case, the I/O device 222 transmits via the I/O expansion bus 220 a sequence of data transfer commands which contain the shared memory destination addresses to which the data words are to be transferred. The commands are sequentially received in the pre-own circuit 57. For each received command, the pre-own circuit 57 first checks the tag RAM 61 to determine if the I/O bridge 230 already owns the data line corresponding to the data which the I/O device 222 desires to transfer. Illustratively, the tag RAM 61 stores the line address and a corresponding pre-own indication for each data line pre-owned by the I/O bridge 230. If the tag RAM 61 stores a pre-own indication for the data line, the pre-own circuit 57 allocates a data line storage location in the data RAM 63 for receiving the corresponding data from the I/O device 222. Thereafter, the pre-own circuit 57 invalidates the pre-own indication stored in the tag RAM 61 for the allocated data line. The pre-own circuit 57 then issues a command to the I/O device 222 to transfer the data to the I/O bridge 230. Data received from the I/O device 222 is stored in the data RAM 63 at an appropriate location within the data line. The location is chosen so that when the data line is written back to the shared memory 260 (as discussed below), the received data will be written to its intended destination address.

If the tag RAM 61 does not store a pre-own indication for the data line corresponding to the data to be received, then the I/O bridge 230 has not yet successfully preliminarily claimed ownership in the corresponding data line. In such a case, the pre-own circuit 57 causes the pre-fetch circuit 55 to attempt to claim ownership in the corresponding data line. To that end, the pre-fetch circuit 55 issues commands to read the corresponding data line and a sequence of one or more of the very next data lines, i.e., immediately preceding or immediately following data lines (depending on whether the data is to be transferred to ascending or descending destination addresses in the shared memory 260). If the I/O bridge 230 successfully claims ownership in a data line, the pre-fetch circuit 55 stores in the tag RAM 61 the line address of that data line and an indication that the data line is pre-owned.

After all the data corresponding to a particular owned data line is received and stored in the data RAM 63, the flush back circuit 59 can "flush" or write back the data line to the shared memory 260.

The snooper circuit 53 monitors the system bus 270 for ownership claiming commands issued by the other agents 240 and 250. If the snooper circuit 53 detects an ownership claim for a data line pre-owned by the I/O bridge 230, but for which the I/O bridge 230 has not yet received any data, the snooper circuit 53 relinquishes ownership in the data line by invalidating the pre-owned indication stored for this data line in the tag RAM 61. Thus, at a later time, the pre-own circuit 57 and pre-fetch circuit 55 may have to re-claim ownership in this data line in order to receive data corresponding thereto.

If the snooper circuit 53 detects an ownership claim for a data line owned by the I/O bridge 230 and for which the I/O bridge 18 has already received some data, the I/O bridge 230 can:

(1) using the snooper circuit 53, issue an intervention command, continue to receive the remaining data for the data line and thereafter write back the data line, or (2) immediately relinquish ownership in the data line by marking the data line invalid in the buffer RAM 63, reclaim ownership in the data line at a later time and request that the I/O device 222 retransmit all of the data corresponding to that data line.

Consider now the case where an I/O device 222 desires to read particular data. The I/O device 222 transmits a sequence of commands to the I/O bridge 230 for reading the particular data. If the data RAM 63 contains the data line corresponding to the particular data read by the I/O device 222, the appropriate data from the data line is transferred from the data RAM 63 to the I/O device 222 via the I/O expansion bus 220. If the data RAM 63 does not contain the corresponding data line, the pre-fetch circuit 55 issues a command for claiming ownership in the corresponding data line. Illustratively, the pre-fetch circuit 55 simply issues a read command on the system bus 270 for reading the corresponding data line from the shared memory 260.

In a conventional I/O bridge, the ownership claiming commands issued from the pre-fetch circuit 55 (e.g., read commands) are first received in the system bus interface 41. The system bus interface 41 transmits the read command on the system bus 270 and then monitors the data and control signals transmitted on the system bus 270. Upon detecting the accessed data on the system bus 260, the system bus interface 41 can receive the data when transmitted from the shared memory 260 or snarf the data when transmitted from another device, e.g., the cache memory 240, to the shared memory 260.

The system bus interface 41, the I/O expansion bus interface 43, the request queue 45, the reply queue 47, the snooper circuit 53, the pre-fetch circuit 55, the pre-own circuit 57 and the flush back circuit 59 can each be formed with intelligent digital finite state machines. The construction of such circuits for performing the above tasks is well known in the art.

Figure 5:
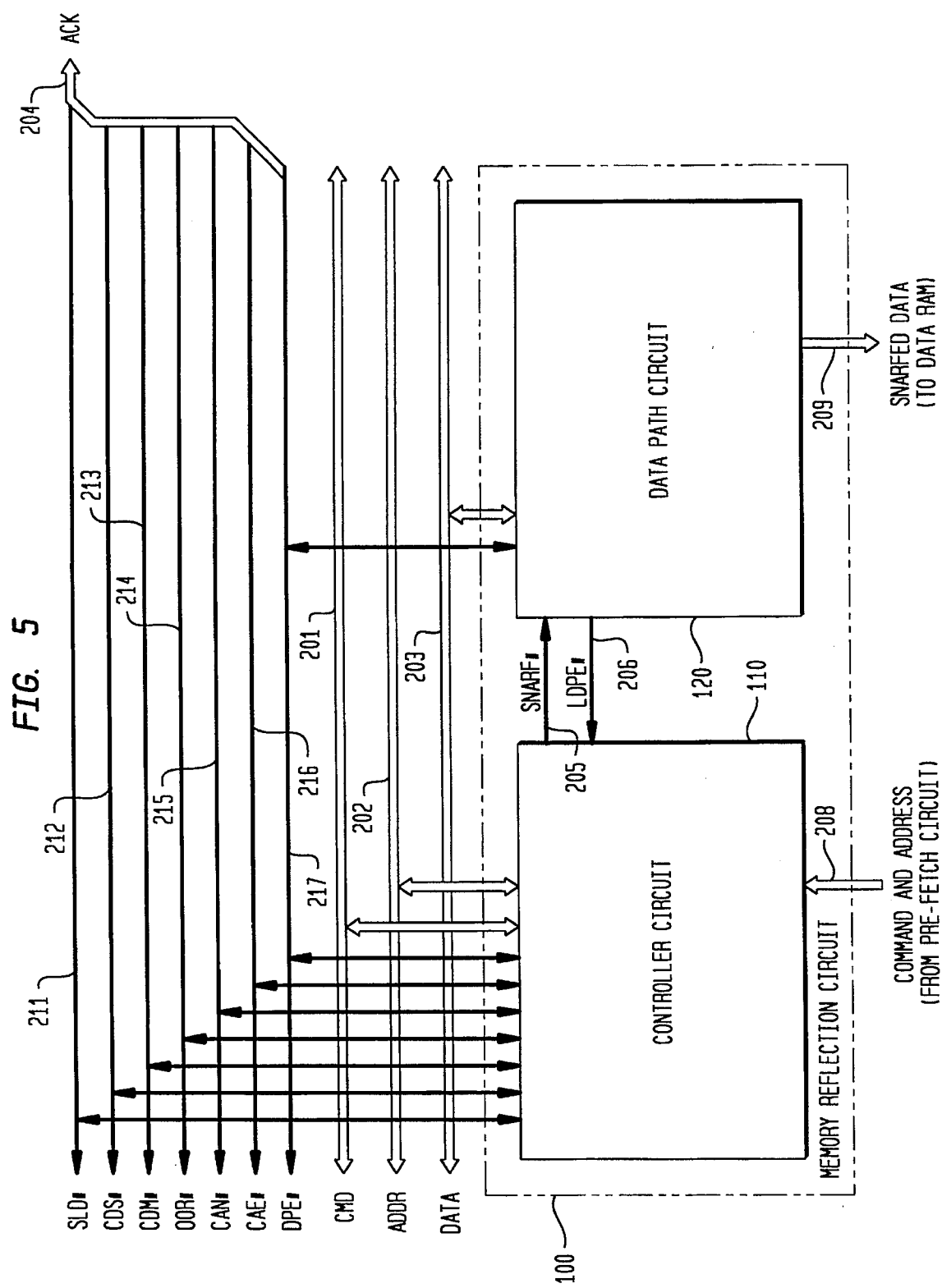
FIG. 5 shows memory reflection circuitry in a snarfing agent of FIG. 4 according to one embodiment of the present invention.

When the I/O bridge 230 issues a command for claiming ownership in a data line, another agent may possibly already own the data line. In such a case, the system bus interface 41 of the I/O bridge 230 is provided with memory reflection circuitry 100 for obtaining ownership in the data using a memory reflection scheme according to the present invention. This memory reflection circuitry 100 is illustrated in FIG. 5. As shown in FIG. 5, the memory reflection circuitry 100 has a controller circuit 110 and a data path circuit 120. Two circuits are illustratively used for implementing the memory reflection circuitry 100 because of pin count limitations for integrated circuits. Illustratively both the controller circuit 110 and the data path circuit 120 are application specific integrated circuits (ASICs).

In FIG. 5, the system bus 270 is shown having the command lines 201, address lines 202, data lines 203 and acknowledgement signal lines 204. Particular acknowledgement lines are shown for carrying the signals: SLD# (line 211), CDS# (line 212), CDM# (line 213), OOR# (line 214), CAN# (line 215), CAE# (line 216), and DPE# (line 217). The controller circuit 110 is connected to the command lines 201, address lines 202 and the particular acknowledgement lines 211, 212, 213, 214, 215, 216 and 217 of the system bus 270. The data path circuit 120 is connected to the acknowledgement line 217 and the data lines 203 of the system bus 270. The controller circuit 110 may transmit a SNARF# signal to the data path circuit 120 on line 205. The data path circuit 120 may transmit the signal LDPE# (Local Data Parity Error) to the controller circuit 110 on the line 206. The purpose of these two signals is described in greater detail below. The controller circuit 110 receives the ownership claiming command and address from the pre-fetch circuit 55 (FIG. 4) via the signal lines 208. The data path circuit 120 outputs the snarfed data to the data RAM 63 (FIG. 4) via the signal lines 209.

The memory reflection circuitry 100 (FIG. 5) alters the snarfing operation of the I/O bridge 230 as summarized in Table 2 below. Unlike the prior art, if only the I/O bridge 230, acting as the snarfing agent, incurs an error during the memory reflection process, the memory reflection is nevertheless completed. The I/O bridge refrains from indicating that it incurred an error (which would extend the memory reflection process for all participating agents) and instead re-issues its read command. Thus, the other agents participating in the memory reflection process may resume ordinary processing despite the I/O bridge 230 incurring an error.

TABLE 2

| Error → location Agent ↓ | error/busy incurred at memory subsystem agent only | error/busy incurred at snarfing agent(s) only | error/busy incurred at memory subsystem agent & snarfing agent |
|---|---|---|---|
| snarfing agent | suspend processing or re-snarf data | if error, re-read data | re-snarf data |
| memory subsystem agent | re-receive data | complete; continue processing | re-receive data |
| write back agent | re-write back data and command | complete; continue processing | re-write back data and command |

The operation of the I/O bridge 230 is now described with reference to FIGS. 4, 5, and 6(*a*)–(*b*). Suppose the I/O device 222 (FIG. 4) connected to the I/O bridge 230 desires to read particular data from the shared memory 214. The I/O device 222 transmits a sequence of read commands to the I/O bridge 230. In response to the read commands, the pre-fetch circuit 55 may issue one or more commands for claiming ownership in the corresponding data lines on cycle one. Illustratively these ownership claiming commands are simply commands for reading the corresponding data line from the shared memory 260. In particular, if the I/O device 222 (for which the I/O bridge 230 issues the read command) does not intend to modify the data line, the command may simply be a "read shared line" (RSL) command. By issuing the RSL command, the I/O bridge 230 reads the data line and indicates that the I/O bridge 230 is willing to share ownership in the data line with another device 240, 250 or 280. Illustratively, if another device 240, 250, or 280 currently owns and has modified the data line, that device must respond on the third cycle after the issuance of a command claiming ownership therein (which is cycle four and is referred to as the acknowledgement phase). If no other device 240, 250 or 280 indicates on cycle four that it owns this data line then the I/O bridge 230 successfully claims ownership in the data line. The shared memory 260 would thus transfer the data line to the I/O bridge 230.

The ownership claiming command is transmitted from the prefetch circuit 55 (FIG. 4) to the system bus interface 41. The system bus interface 41 issues the command and corresponding address on the command and address lines 201 and 202 on cycle one. Furthermore, the ownership claiming command is inputted to the controller circuit 110 (FIG. 5) of the memory reflection circuit 100. In response, the controller circuit 110 monitors the acknowledgement lines 204 to determine whether or not the ownership claim was successful.

Suppose that at the time the I/O bridge 230 issues its RSL command to read a particular data line, another agent, e.g., the cache memory 240, owns, has modified, but has not yet written back the particular data line in which the I/O bridge 230 claims ownership. Thus on cycle four, the cache memory 240 transmits appropriate CDM# and CAN# signals indicating that the cache memory 240 currently owns the data line and must write it back to the shared memory 260. The CDM# and CAN# signals cause an intervention.

The shared memory 260 also transmits an SLD# signal indicating receipt of the RSL command issued by the I/O bridge 230. However, the CDM# and CAN# signals cause the shared memory 260 to abort transferring data to the I/O bridge 230.

The CDM# and CAN# signals are detected at the controller circuit 110 (FIG. 5) of the memory reflection circuitry 100. As a result, the controller circuitry 110 enters a snarfing state. In the snarfing state, the controller circuit 110 tracks the transmission of commands and addresses on the signal lines 201 and 202 in order to receive the data line as it is written back to the shared memory 260 as described below.

Suppose that on cycle six, the cache memory 240, acting as the write back agent, issues an appropriate command for writing back the particular modified data line (which the I/O bridge 230 attempted to read) to the shared memory 260, acting as the memory subsystem agent. As depicted in FIG. 6(*a*), the write back agent accomplishes this task by issuing the commands C, CMD and CS# which are a "write cache line" (WCL) command on the command lines 201 and the address (ADDR) of the data line to be written back on the address lines 202. On cycles seven to ten, the write back agent then transmits the data (DATA) on the data lines 203.

However, suppose that the memory subsystem agent 260 is busy servicing a previous data access command at the time the write back agent 240 issues the write back command. In such a case, the memory subsystem agent 260 issues an appropriate CAN# signal on cycle nine. This signal is detected at both the write back agent 240 and the controller circuit 110. In response, the write back agent 240 re-issues its write back command C, CMD and CS#, and corresponding address (ADDR) on cycle eleven. (Illustratively, in response to such a CAN# signal, a conventional write back agent 240 repeatedly attempts to write back the data until it is successfully received at the memory subsystem agent 260.) Furthermore, in response to detecting the CAN# signal, the data path circuit 120 and the controller circuit 110 (FIG. 5) determine that the first write back of the data line to the memory subsystem agent 260 (on cycles six to ten) was unsuccessful. As such, the snarfing agent 230 re-snarfs the data. That is, the controller circuit 110 generates on cycle 12 an appropriate SNARF# signal on signal line 205 for causing the data path circuit 120 to receive the data line written back on cycles twelve to fifteen.

Figure 6A:
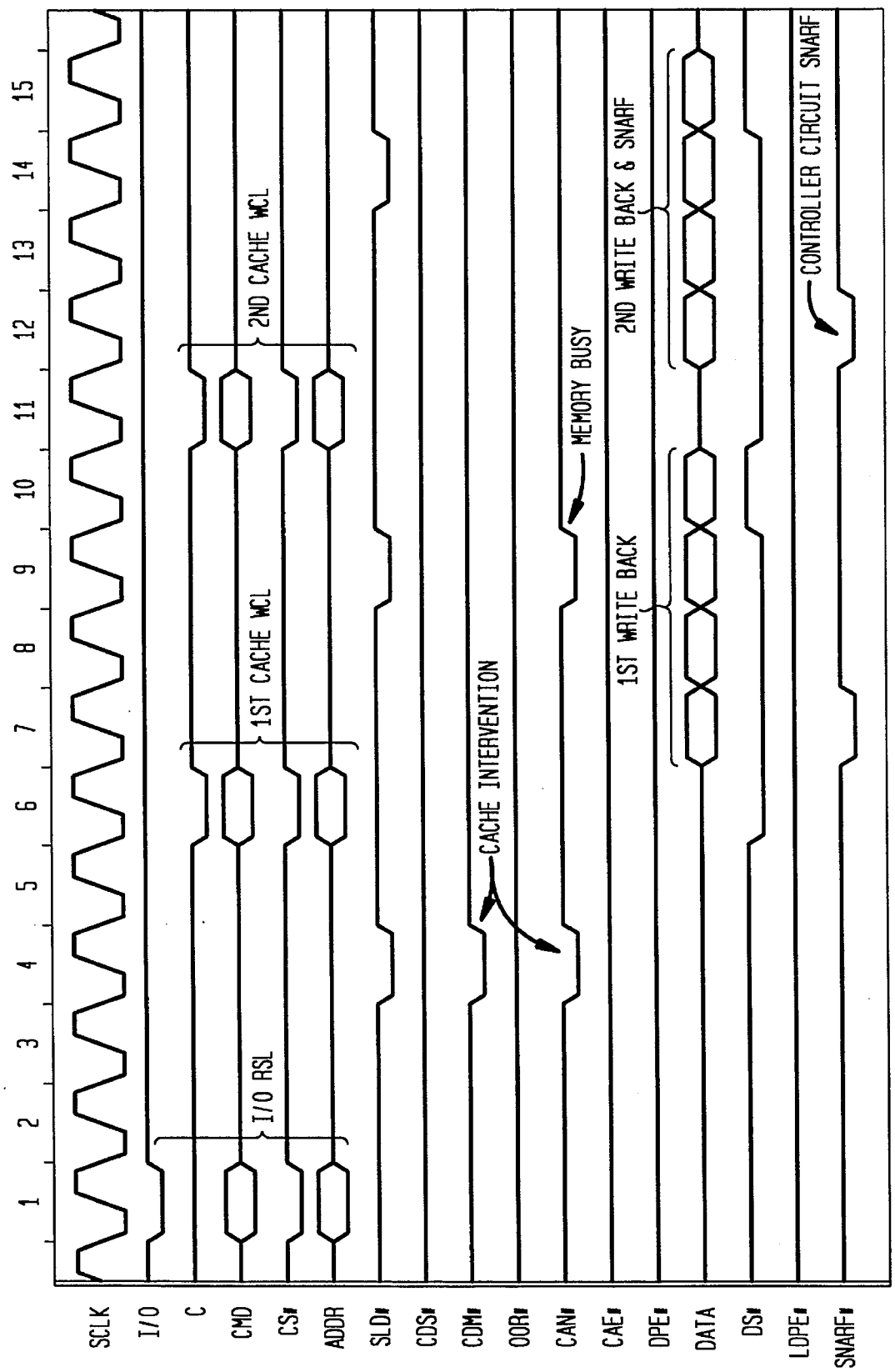

As shown in FIG. 6(*a*), the second write back of the data line on cycles twelve to fifteen is successful. Illustratively, the memory reflection circuitry 100 detects the successful write back of data by the absence of any error or busy signals CAN#, CAE# or DPE# during the writing back of data on cycles twelve to fifteen. Because the controller circuit 110 does not detect an error or busy signal by cycle twelve and the controller circuit 110 has already generated a SNARF# signal on cycle twelve, the data path circuit 120 receives the data line from the signal lines 203 on cycles twelve to fifteen. Alternatively, if the data line has already been successfully snarfed, the data path circuit 120 simply ensures that the memory subsystem agent 260 does not generate a DPE# signal indicating an error in the written back data line itself. If the data path circuit 120 does not detect such a DPE# error signal, the data path circuit 120 permits the snarfing agent 230 to process the received data line. For example, if the data line was successfully written back, the data path circuit illustratively stores the received data in the data RAM 63.

FIG. 6(*b*) shows a slightly different scenario from FIG. 6(*a*). In FIG. 6(*b*), the controller circuitry 110 issues an RSL command on cycle one and the cache memory 240, which has modified this data line, issues appropriate CAN# and CDM# signals on cycle four. Suppose that on cycle six, the cache memory 240, acting as the write back agent, issues commands C, CMD, CS# and address ADDR. These commands constitute an appropriate WCL command for writing back the modified data line. The WCL command is issued to the shared memory 260, acting as the memory subsystem agent. The controller circuit 110 detects this write command on the signal lines 201 and the address of the command line which it unsuccessfully attempted to read. In response, the controller circuit 110 transmits an appropriate SNARF# signal to the data path circuit 120 on cycle seven. In response to the SNARF# signal, the data path circuit 120 snarfs, i.e., receives the data transmitted from the write back agent 240 on cycles seven to ten (at the same time the data is received at the memory subsystem agent 260).

Suppose, as is depicted in FIG. 6(*b*), the write back agent 240 did not successfully write back the data line to the memory subsystem agent 260, e.g., the memory subsystem agent 260 detected an error in the written back data line. However, the data path circuit 120 successfully snarfed the data line. On cycle nine, the memory subsystem agent 260 transmits an appropriate DPE# error on the signal line 217. This signal is received at the write back agent 240 which re-attempts to write back the data line. For example, on cycle thirteen, the write back agent 240 illustratively issues a WCL command on command lines 201 and the address of the data line "ADDR" on the address lines 202. Furthermore, the write back agent 240 illustratively transmits the modified data line on cycles fourteen to seventeen.

The DPE# signal is also received at the data path circuit 120 (FIG. 5). Because the write back agent 240 must again re-write back the data line, the write back agent 240 does not relinquish ownership therein. Thus, the data path circuit 120 suspends further processing of the received data line, until the write back agent 240 successfully writes back the data line to the memory subsystem agent 260 (FIG. 4). The DPE# signal is also received at the controller circuit 110 which determines that the memory subsystem agent 260 did not successfully receive the written back data line (and thus should monitor the acknowledgment lines 204 for the occurrence of errors on a subsequent write back of the data line to the memory subsystem agent). As shown in FIG. 6(*b*), the data line is successfully received at the memory subsystem agent 260 on cycles fourteen to seventeen. The memory reflection circuitry 100 detects this by the absence of busy or error signals on the system bus 270. That is, the controller circuit 110 does not detect a CAN# or CAE# signal and the data path circuit 120 does not detect a DPE# signal indicating an error or busy condition. Upon detecting the successful write back of data to the memory subsystem agent 260, the data path circuitry 120 resumes processing the snarfed data line, e.g., by transferring the data line from the system bus interface 41 to the data RAM 63.

FIGS. 7(*a*)–(*b*) illustrate the operation of the memory reflection circuitry 100 (FIG. 5) in the event that only the snarfing by the snarfing agent 230 is unsuccessful, i.e., an error is only detected at the snarfing agent 230 (FIG. 4). In both of these scenarios, the I/O bridge 230 (snarfing agent) issues an RSL command on cycle one and the cache memory 240 (write back agent) issues appropriate CAN# and CDM# to cause an intervention on cycle four. On cycle six, the write back agent 240 issues a WCL command on the command lines 201 and the address of the modified data line on the address lines 202 (FIG. 5). On cycles seven to ten, the write back agent 240 transfers the modified data line on the data line 203. The write back of the data line to the memory subsystem agent 260 (FIG. 4) is illustratively successful. That is, the WCL command, address and data are illustratively received at the shared memory 260 (memory subsystem agent) without incurring an error or busy condition. The success of the write back is illustratively detected at the memory reflection circuitry 100 (FIG. 5). That is, the controller circuit 110 does not detect a CAE# or CAN# signal and the data path circuit 120 does not detect a DPE# signal indicating an error or busy condition.

Figure 7A:
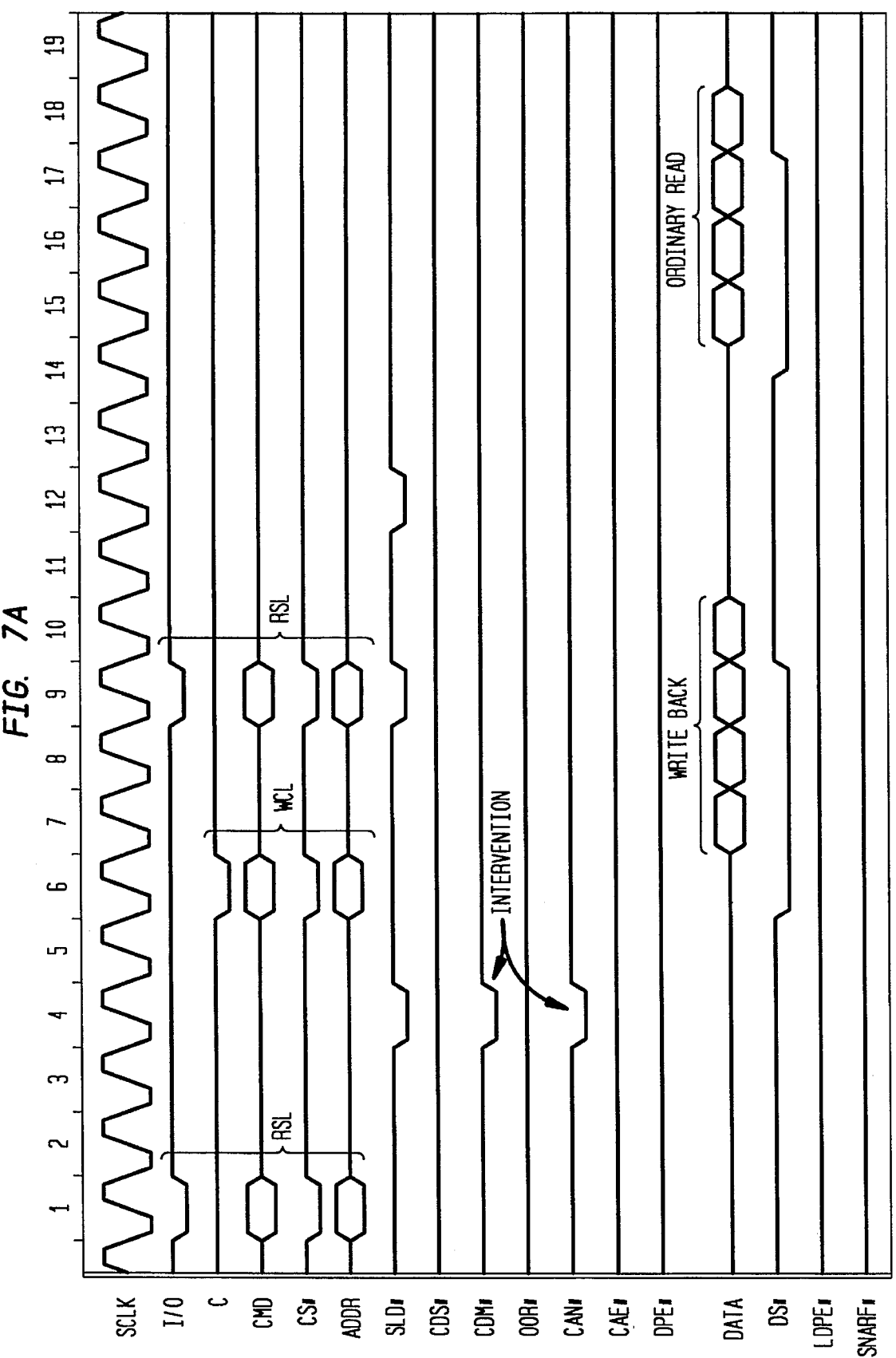
FIGS. 7(a)–7(b) are timing diagrams illustrating scenarios in which only the memory reflection circuitry incurs an error or busy condition.

FIG. 7(a) depicts the scenario where the controller circuit 110 is in the snarfing state and prepares to snarf the data during the write back process. However, because the controller circuit 110 detects an error in the command or address transmitted on the lines 201 or 202, respectively, or is busy during cycle six, the controller circuit 110 aborts the snarfing attempt. Thus, no SNARF# signal is generated on line 205 for causing the data path circuit 120 to receive the data line written back during cycles seven-ten. Rather, the controller circuit 110 monitors the signal lines 215, 216 and 217 to determine if the memory subsystem agent 260 generates a CAE#, CAN# or DPE# signal indicating an error or busy condition. As mentioned above, the write back agent 230 successfully writes back the modified data line to the memory subsystem agent 260. Thus, the memory subsystem agent 260 does not generate such an error or busy signal.

The controller circuit 110 thus determines that the write back was successful and exits the snarfing state. The controller circuit 110 then re-issues its RSL command on cycle nine to read the data line from the memory subsystem agent 260 (which is in the process of being written back to the memory subsystem agent 260). On cycle twelve, the memory subsystem agent 260 illustratively responds to the RSL issued by the controller circuit 110 with the SLD# signal indicating that it successfully received the RSL command. Furthermore, no other agent currently owns a modified copy of the data line. Thus, no intervention commands are issued in response to the RSL issued by the controller circuit. On cycles fifteen to eighteen, the memory subsystem agent 260 transfers the data line on the signal lines 203. This data line is received by the system bus interface 41 (FIG. 4) in an ordinary fashion without the aid of the data path circuit 120 (FIG. 5).

Figure 7B:
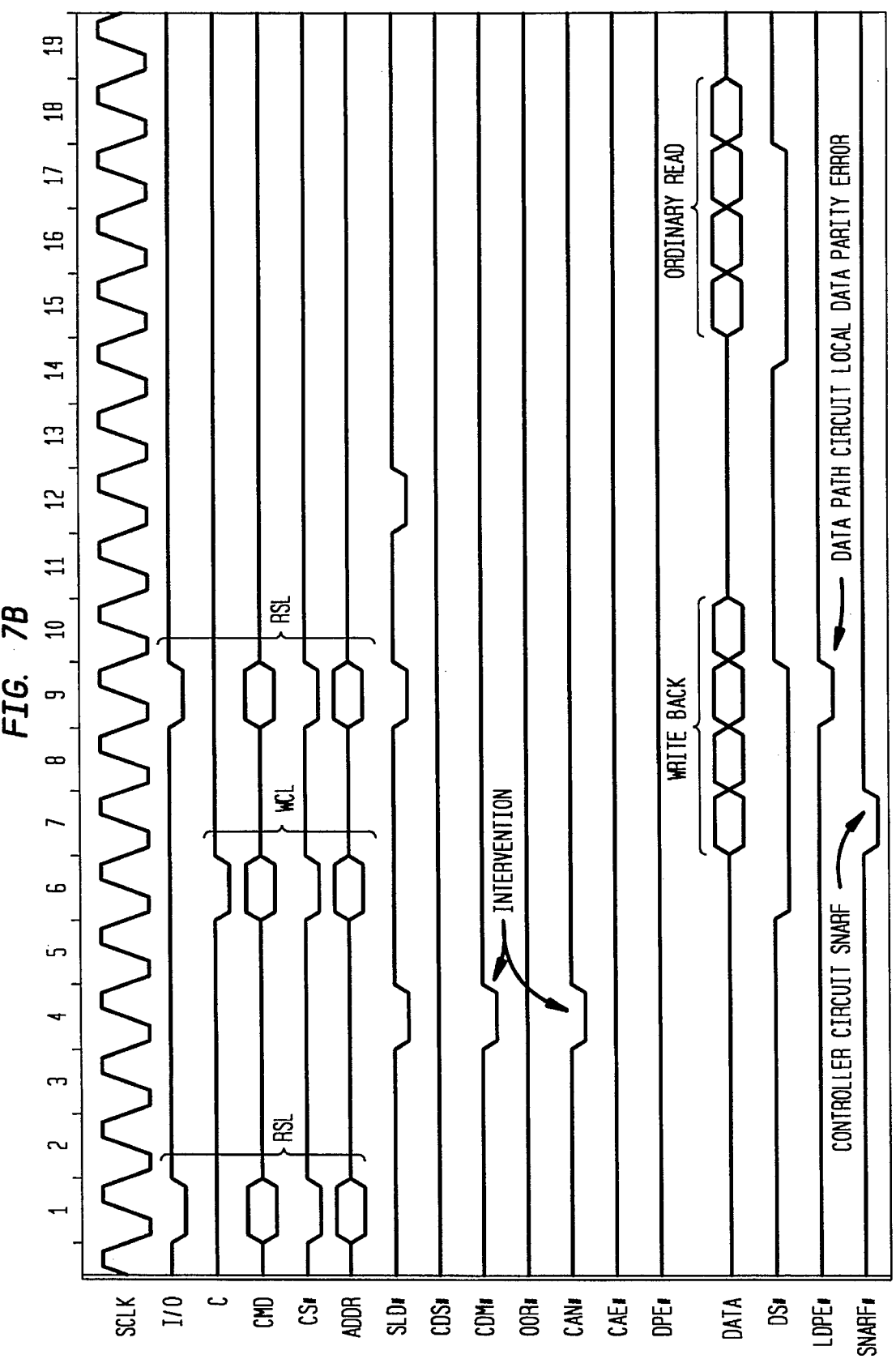

FIG. 7(b) depicts the scenario in which the controller circuit 110 successfully detects the WCL command and corresponding address during cycle six. In response thereto, the controller circuit 110 issues a SNARF# signal and the data path circuit 120 snarfs the data written back from the write back agent 240 to the memory subsystem agent 260 during cycles seven to ten. However, the data path circuit 120 detects a parity error in the snarfed data. In such a case, the data path circuit 120 transmits an LDPE# signal on cycle nine to the controller circuit 110 to indicate a local error, i.e., the data path circuit's failure to receive an error free snarfed data line. In response, the controller circuit 110 exits the snarfing state. On cycle nine, the controller circuit 110 reissues its RSL command and corresponding address to read the data line from the memory subsystem agent 260 (which data line is currently being received thereat). As shown in FIG. 7(b), the RSL command is acknowledged on cycle twelve by the SLD# signal and the data line is transferred to the system bus interface 41 on cycles fifteen to eighteen. Again, the data line is received at the system bus interface 41 in an ordinary fashion without the assistance of the data path circuit 120.

In each of the above scenarios, the memory reflection circuit 100 does not generate an error signal (such as a CAE#, CAN# or DPE# error signal) even though the snarfing agent 230 containing the memory reflection circuit 100 incurred an error or busy condition. Such a signal would cause the write back agent 240 to re-write back the modified data line, thereby preventing the write back agent 240 from resuming its ordinary processing. Instead, the memory reflection circuit 100 re-issues its read command for reading the data line from the memory subsystem agent 260. The write back agent 240 may therefore resume ordinary processing sooner.

In the above scenarios depicted in FIGS. 7(a) and 7(b), it was presumed that only the snarfing agent 230 incurred an error or busy condition. In the event both the snarfing agent 230 and the memory subsystem agent 260 incur an error or busy condition at the same time, the controller circuit 230 remains in the snarfing state despite the occurrence of a local error or busy condition at the interface circuit 100. This is because the write back agent 240 must re-write back the modified data line to the memory subsystem agent 260 anyway.

Figure 8A:
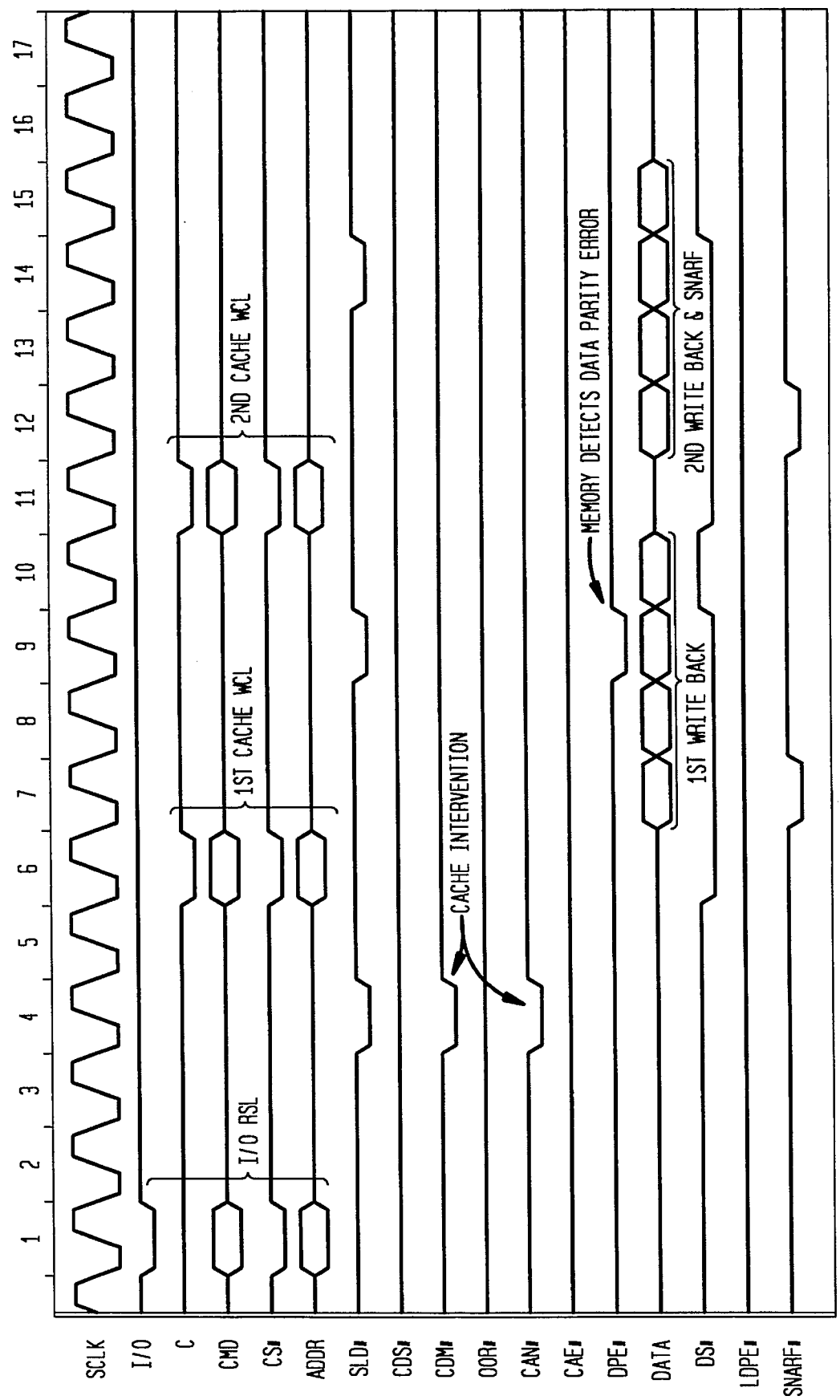
FIGS. 8(a)–8(b) are timing diagrams illustrating scenarios in which both the memory subsystem agent and the snarfing agent containing the memory reflection circuit incur error or busy conditions.
Figure 8B:
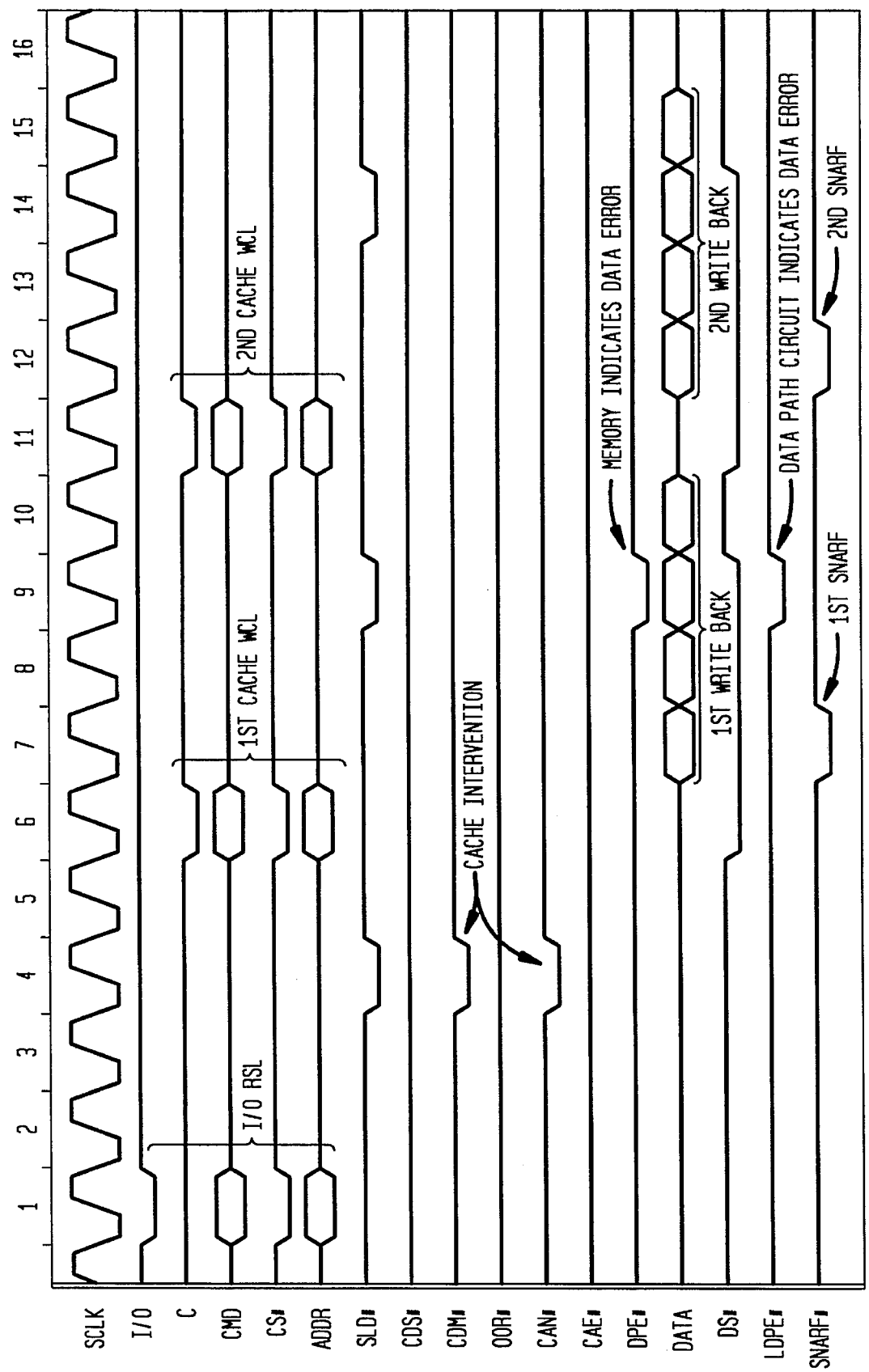

FIGS. 8(a) and 8(b) depict illustrative examples in which both the snarfing agent 230 and memory subsystem agent 260 incur an error during a write back. Initially, the controller circuitry 110 issues an RSL command on cycle one. In response thereto, the cache memory 240 issues appropriate CAN# and CDM# signals on cycle four indicating it owns and has modified this data line. On cycle six, the cache memory 240, acting as the write back agent, issues an appropriate WCL command for writing back the modified data line to the shared memory 260, acting as the memory subsystem agent.

In FIG. 8(a), both the snarfing agent 230 and the memory subsystem agent 260 successfully receive the WCL command and address issued by the write back agent on cycle six without incurring an error or busy condition. The memory subsystem agent 260 successfully receives the WCL command and address and thus does not genarate a CAE# or CAN# signals indicating an error or busy status. However, the memory subsystem agent 260 illustratively, detects an error in the data line written back during cycles seven to ten. As such, the memory subsystem agent 260 issues a DPE# error signal on cycle nine. This error signal is detected at the controller circuit 110 (FIG. 5). In response, the controller circuit 110 remains in the snarfing state. Thus, during the re-writing back of the modified data line on cycles twelve to fifteen, the controller circuit 110 issues a SNARF# signal on cycle twelve to cause the data path circuit 120 to receive the data line during cycles twelve to fifteen.

Initially in FIG. 8(b), as in FIG. 8(a), both the snarfing agent 230 and the memory subsystem agent 260 successfully receive the WCL command and address issued by the write back agent on cycle six without incurring an error or busy condition. However, both the memory subsystem agent 260 and the snarfing agent 230 detect a data parity error in the data written back from the write back agent on cycles seven to ten. In response, the memory subsystem agent 260 issues a DPE# signal on signal line 217 to inform the write back agent to re-write back the modified data line. Furthermore, the data path circuit 120 issues the LDPE# signal on the signal line 206. Both the DPE# and LDPE# signals are issued on cycle 9. The controller circuit 110 detects both of these signals indicating that both the snarfing agent 230 and the memory subsystem agent 260 incurred an error. As such, the controller circuit 230 remains in the snarf state. When the write back agent 240 re-writes back the data line to the memory subsystem agent 260 on cycles twelve to fifteen, the controller circuit 110 issues a SNARF# signal on cycle 12 and the data path circuit 120 re-snarfs the data line during cycles twelve to fifteen.

The present invention may be utilized with an arbitrary mix of conventional snarfing agents and snarfing agents adapted according to the present invention. Conventional snarfing agents may be included because the snarfing agents according to the present invention do not distinguish between error and busy signals issued by the memory subsystem agent and those issued by a conventional snarfing agent. Rather, the snarfing agents according to the present invention suspend further processing or re-snarf the data any time the write back agent must re-write back the data line.

Figure 9:
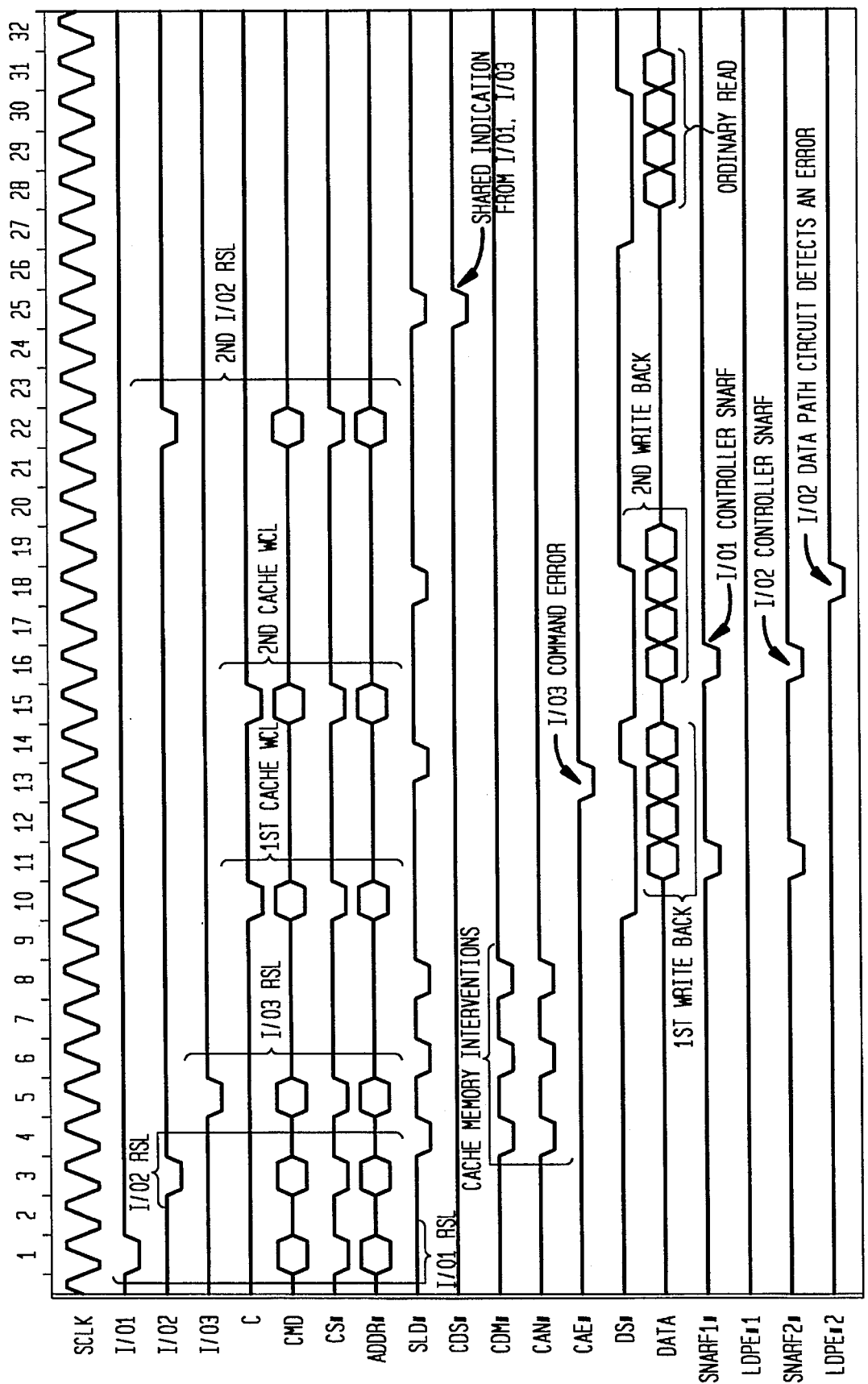
FIG. 9 is a timing diagram depicting a scenario in which a mix of conventional snarfing agents and snarfing agents according to the present invention contemporaneously attempt to snarf data written back to the shared memory of FIG. 4.

FIG. 9 depicts a timing diagram in which three devices attempt to claim ownership in the same data line contemporaneously, which data line is owned by yet another agent. For instance, suppose three I/O bridges 230, 250 and 280 (FIG. 4) attempt to claim ownership in the data lines contemporaneously, on cycles one, three and five, respectively. However, the write back agent (cache memory) 240 currently owns, has modified, but has not yet written back the data line in which the I/O bridges 230, 250 and 280 claim ownership. As such, the cache memory 240 issues appropriate CDM# and CAN# signals on cycles four, six and eight to cause an intervention in response to each of the aforementioned ownership claiming commands issued on cycles one, three and five, respectively. This causes each of the I/O bridges 230, 250 and 280 to act as snarfing agents for snarfing the written back data line.

Suppose on cycle ten the write back agent 240 issues a WCL command to write back the modified data line to the memory subsystem agent 260. Furthermore, on cycles eleven to fourteen, the write back agent 240 writes back the modified data line. However, the conventional snarfing agent 280 incurs an error in receiving the WCL command or address. Thus, the snarfing agent 280 issues an appropriate CAE# signal on cycle thirteen indicating an error.

The CAE# signal is detected at the write back agent 240, the I/O bridges 230 and 250 and the memory subsystem agent 260. In response, the I/O bridges 230 and 250 and the memory subsystem agent 260 disregard the data written back on cycles eleven to fourteen. Furthermore, the write back agent 240 re-writes back the data on cycles sixteen to nineteen.

Illustratively, each snarfing agent 230, 250 and 280 and the memory subsystem agent 260 receive the second WCL command and address issued from the write back agent 240 on cycle fifteen. On cycles sixteen to nineteen, the memory subsystem agent 260 successfully receives the written back data line. Furthermore, the third I/O bridge 280 successfully snarfs the written back data line. On cycle sixteen, the controller circuit 110 in the first snarfing agent 230 issues a SNARF1# signal to cause the data path circuit 120 therein to snarf the data line. Likewise, the controller circuit 110 in the second snarfing agent 250 issues a SNARF2# signal to cause the data path circuit 120 therein to snarf the data line.

Illustratively, the data path circuit 120 of the second snarfing agent 250 detects an error in the snarfed data and issues an LDPE2# signal on cycle eighteen to the controller circuit 110 therein. Because no other agent 230, 260 or 280 issued an error signal, the controller circuit 110 of the second I/O bridge 250 exits the snarfing state and re-issues its ownership claiming command on cycle twenty-two. Illustratively, the first and third I/O bridges 230 and 280 respond on cycle twenty-five with a CDS# signal indicating that the data line must be shared. Furthermore, the shared memory 260 transmits the data line to the second I/O bridge 250 on cycles twenty-eight to thirty-one.

In the above scenario, the conventional snarfing agent 280 caused all of the other agents 230, 240, 250 and 260 participating in the memory reflection scheme to refrain from resuming (i.e., suspend) other processing until after cycle nineteen. On the other hand, the snarfing agent 250 according to the present invention permitted the other agents 230, 240, 260 and 280 to resume other processing. Thus, even if a mix of conventional snarfing agents and snarfing agents according to the present invention are provided in the computer system 200, the processing speed of the memory reflection scheme is increased.

In short, a method and system are disclosed for efficiently implementing memory reflection. When a snarfing agent issues a command to access a modified data line owned by a write back agent, the write back agent issues an intervention command. The write back agent then writes back the data to the memory subsystem agent. The snarfing agent attempts to snarf the written back data. In the event only the snarfing agent incurs an error or busy condition, the snarfing agent re-issues its data access command. In the event only the memory subsystem agent incurs an error or busy condition, the snarfing agent suspends further processing of the snarfed data until the write back agent successfully writes back the data to the memory subsystem agent. If both the snarfing and memory subsystem agents incur an error or busy condition, the snarfing agent re-attempts to snarf the data when the write back agent subsequently re-writes back the data to the memory subsystem agent. In this fashion, the integrity of the data is maintained in an efficient manner, even in the event of an error or busy condition.

Finally, the invention has been described above with reference to illustrative embodiments. For instance, the invention has been described above with reference to an I/O bridge as an illustrative snarfing agent. However, the invention may be implemented in other snarfing agents such as processors, cache memories, etc. Those having ordinary skill in the art may devise numerous other embodiments without departing from the spirit and scope of the following claims.

The invention claimed is:

1. Memory reflection circuitry which snarfs particular data, that is written back from a write back agent to a memory subsystem agent, said memory reflection circuitry issuing a command to read said particular data from said memory subsystem agent, in response to unsuccessfully snarfing said particular data, but only if said memory subsystem agent successfully received said particular data.

2. A snarfing agent comprising memory reflection circuitry which snarfs particular data, that is written back from a write back agent to a memory subsystem agent, said memory reflection circuitry issuing a command to read said particular data from said memory subsystem agent, in response to unsuccessfully snarfing said particular data, but only if said write back agent successfully writes back said particular data to said memory subsystem agent.

3. The snarfing agent of claim 2 wherein said memory reflection circuitry receives data command and error signals from said write back agent and said memory subsystem agent via a bus interconnecting said snarfing agent, said write back agent and said memory subsystem agent.

4. The snarfing agent of claim 2 wherein said memory reflection circuitry determines that said snarfing was unsuccessful upon detecting an error in receiving a write command at said memory reflection circuitry, which write command issued from said write back agent for writing back said particular data to said memory subsystem agent.

5. The snarfing agent of claim 2 wherein said memory reflection circuitry determines said snarfing was unsuccessful upon detecting an error in receiving an address of a write command at said memory reflection circuitry, which address and write command issued from said write back agent for writing back said particular data to said memory subsystem agent.

6. The snarfing agent of claim 2 wherein said memory reflection circuitry determines said snarfing was unsuccessful upon detecting an error in said particular data as received at said memory reflection circuitry, which particular data is written back from said write back agent to said memory subsystem agent.

7. The snarfing agent of claim 2 wherein in response to said memory reflection circuitry successfully snarfing said particular data but determining that said write back agent unsuccessfully wrote said particular data back to said memory subsystem agent, said memory reflection circuitry suspends processing said snarfed data until said write back agent successfully re-writes back said particular data to said memory subsystem agent.

8. The snarfing agent of claim 7 wherein said snarfing agent determines that said write back agent unsuccessfully wrote back said data to said memory subsystem agent by detecting an error signal transmitted from said memory subsystem agent to said write back agent.

9. The snarfing agent of claim 2 wherein in response to said memory reflection circuitry unsuccessfully snarfing said particular data and detecting that said write back agent unsuccessfully wrote said data back to said write back agent, said memory reflection circuit re-attempts to snarf said particular data when said write back agent re-writes back said particular data to said memory subsystem agent.

10. The snarfing agent of claim 2 wherein said memory reflection circuitry comprises:

a controller circuit for determining when said write back agent writes back said particular data by monitoring commands, addresses and command acknowledgment signals transmitted on a system bus interconnecting said write back agent, said memory subsystem agent and said snarfing agent, and a data path circuit, responsive to said controller circuit, for monitoring said command acknowledgment signals and data transmitted on said system bus and for receiving said particular data written back from said write back agent at approximately the same time as said memory subsystem agent.

11. The snarfing agent of claim 10 wherein in response to detecting an error in snarfing said particular data, said data path circuit transmits a local error signal to said controller circuit, and wherein, in response to receiving said local error signal, said controller circuit issues a command to read said particular data from said memory subsystem agent only if said write back agent successfully writes back said particular data to said memory subsystem agent.

12. A computer system comprising:

a bus for transferring data and commands, a shared memory connected to said bus, a write back agent, connected to said bus, which responds to detecting a command to access modified data contained therein, by issuing an intervention command via said bus and writing back said modified data contained therein to said shared memory via said bus, and a snarfing agent, connected to said bus, for issuing via said bus a command for accessing particular data, said snarfing agent comprising memory reflection circuitry which, in response to detecting an intervention command issued by said write back agent, snarfs said particular data transmitted from said write back agent to said shared memory via said bus, and which, in response to detecting an error in said snarfed data, re-issues said read command if said write back agent successfully wrote back said particular data to said shared memory.

13. The computer system of claim 12 wherein said memory reflection circuitry comprises a controller circuit for re-issuing said commands on said bus and a data path circuit for snarfing said data and for detecting errors in said snarfed data in response to a local control signal transmitted from said control circuit.

14. The computer system of claim 13 wherein in response to detecting an error in said snarfed data, said data path circuit transmits a local error signal to said controller circuit, and wherein, in response to receiving said local error signal and determining that said writing back of data to said shared memory was successful, said controller circuit issues a command for reading said data from said shared memory.

15. The computer system of claim 14 wherein said write back agent repeatedly writes back said data to said shared memory until said data is successfully received thereat, wherein in response to receiving said local error signal and determining that said writing back of data was unsuccessful, said controller circuit snarfs said particular data subsequently written back from said write back agent to said shared memory.

16. A method for accessing particular data at a snarfing agent comprising:

at said snarfing agent, snarfing said particular data as said particular data is written back from a write back agent to a memory subsystem agent, and if said snarfing step was unsuccessful, issuing a command from said snarfing agent to said memory subsystem agent to access said particular data, but only if said particular data was successfully written back to said memory subsystem agent.

17. The method of claim 16 wherein said step of snarfing comprises the steps of:

at said snarfing agent, monitoring a bus interconnecting said write back agent and said memory subsystem agent for a command to write back data having an address identical to said particular data, upon detecting said command in said step of monitoring, receiving, at said snarfing agent, said particular data as said write back agent writes back said particular data to said memory subsystem agent.

18. The method of claim 17 wherein said step of snarfing is successful if:

(1) said snarfing agent detects that said write back command is error free, (2) said snarfing agent is available to receive said data upon detecting said write back command, and (3) said snarfing agent receives said data error free.

19. The method of claim 16 wherein said write back agent repeatedly writes said particular data back to said memory subsystem agent until successfully received thereat, said method further comprising the step of, if said snarfing step was unsuccessful and said particular data was unsuccessfully written back to said memory subsystem agent, snarfing said particular data when said write back agent subsequently writes back said particular data to said memory subsystem agent.

20. The method of claim 19 further comprising the steps of:

at said snarfing agent, monitoring acknowledgement signals transmitted on a bus connecting said write back agent and said memory subsystem agent, and at said snarfing agent, determining that said write back agent successfully wrote back said data depending on an acknowledgement signal transmitted from said memory subsystem agent.

21. The method of claim 16 further comprising the step of:

if said step of snarfing was successful, suspending processing of said snarfed data at said snarfing agent until said write back agent successfully writes said particular data back to said memory subsystem agent.

22. The method of claim 21 further comprising the steps of:

at said snarfing agent, monitoring acknowledgement signals transmitted from said memory subsystem agent to said write back agent, and at said snarfing agent, determining that said write back agent successfully wrote said particular data back to said memory subsystem agent depending on said acknowledgement signals.

23. Memory reflection circuitry which executes a snarfing operation by which said memory reflection circuitry obtains a copy of data as said data is written back from a write back agent to a memory subsystem agent and simultaneously obtains ownership of said data, said memory reflection circuitry issuing a command to read said data, from said memory subsystem agent, in response to said memory reflection circuitry failing to obtain said copy of said data during said snarfing operation, but only if said memory subsystem agent successfully received said data.

24. The memory reflection circuitry of claim 23 wherein in response to:

(a) said memory reflection circuitry failing to obtain said copy of said data during said snarfing operation, and (b) said memory subsystem agent unsuccessfully receiving said modified copy of said particular data, said memory reflection circuitry waits for said write back agent to rewrite back said modified copy of said data to said memory subsystem agent and re-executes said snarfing operation.

25. A snarfing agent which issues a command for purposes of claiming ownership in particular data, thereby causing a write back agent, which currently owns a modified copy of said particular data, to issue a intervention command and to write back said modified copy of said particular data to a memory subsystem agent, said writing back of said data over-writing a stale copy of said particular data in said memory subsystem agent, thereby maintaining integrity in said particular data, said snarfing agent comprising memory reflection circuitry which executes a snarfing operation by which said memory reflection circuitry simultaneously obtains a copy of said modified copy of said particular data as said modified copy of said particular data is written back from said write back agent to said memory subsystem agent and simultaneously obtains ownership of said particular data for said snarfing agent, said memory reflection circuitry issuing a command to read a copy of said particular data from said memory subsystem agent, in response to said memory reflection circuitry failing to obtain said copy of said modified copy of said particular data during said snarfing operation, but only if said memory subsystem agent successfully received said modified copy of said particular data.

26. The snarfing agent of claim 25 wherein in response to:

(a) said memory reflection circuitry failing to obtain said copy of said modified copy of said particular data during said snarfing operation, and (b) said memory subsystem agent unsuccessfully receiving said modified copy of said particular data, said memory reflection circuitry waits for said write back agent to rewrite back said modified copy of said data to said memory subsystem agent and re-executes said snarfing operation.

* * * * *